May 7, 1968  A. BROTHMAN ET AL  3,382,483
TELEMETERING SYSTEM FOR DETERMINING PHASE ANGLE
Filed Oct. 30, 1963  15 Sheets-Sheet 1
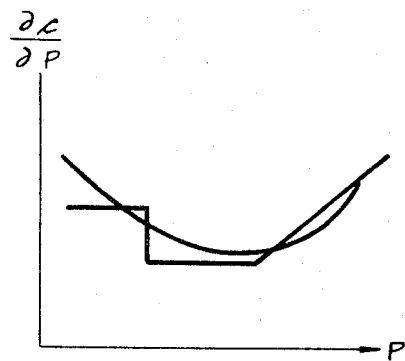
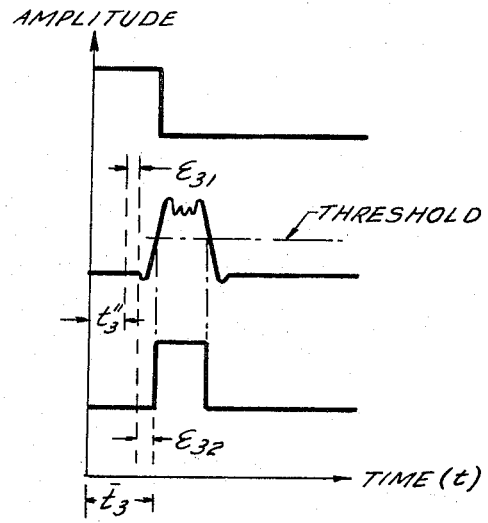
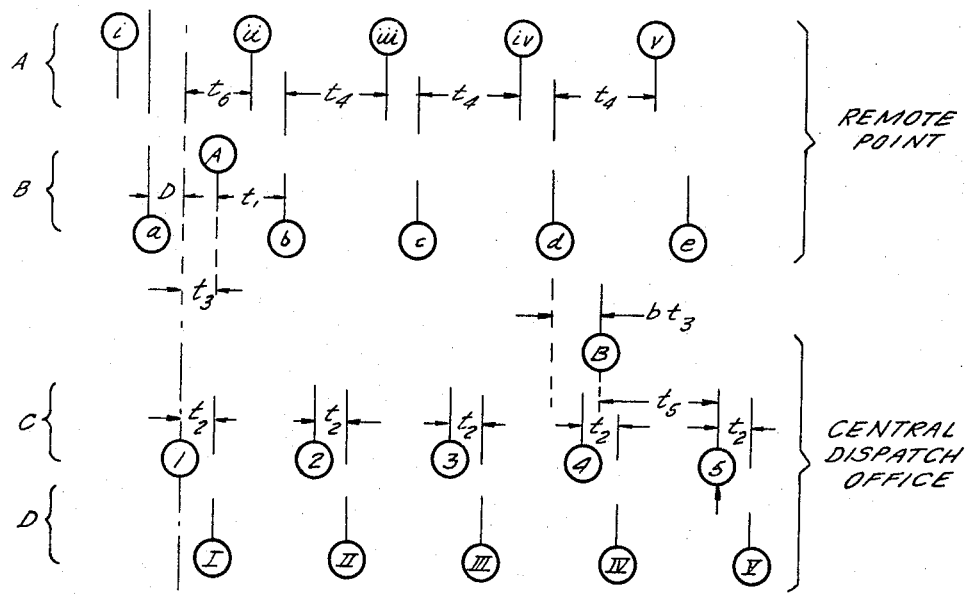
INVENTORS
ABRAHAM BROTHMAN
CONRAD YANIS
BY
OSTROLENK, FABER, GERB & SOFFEN
ATTORNEYS

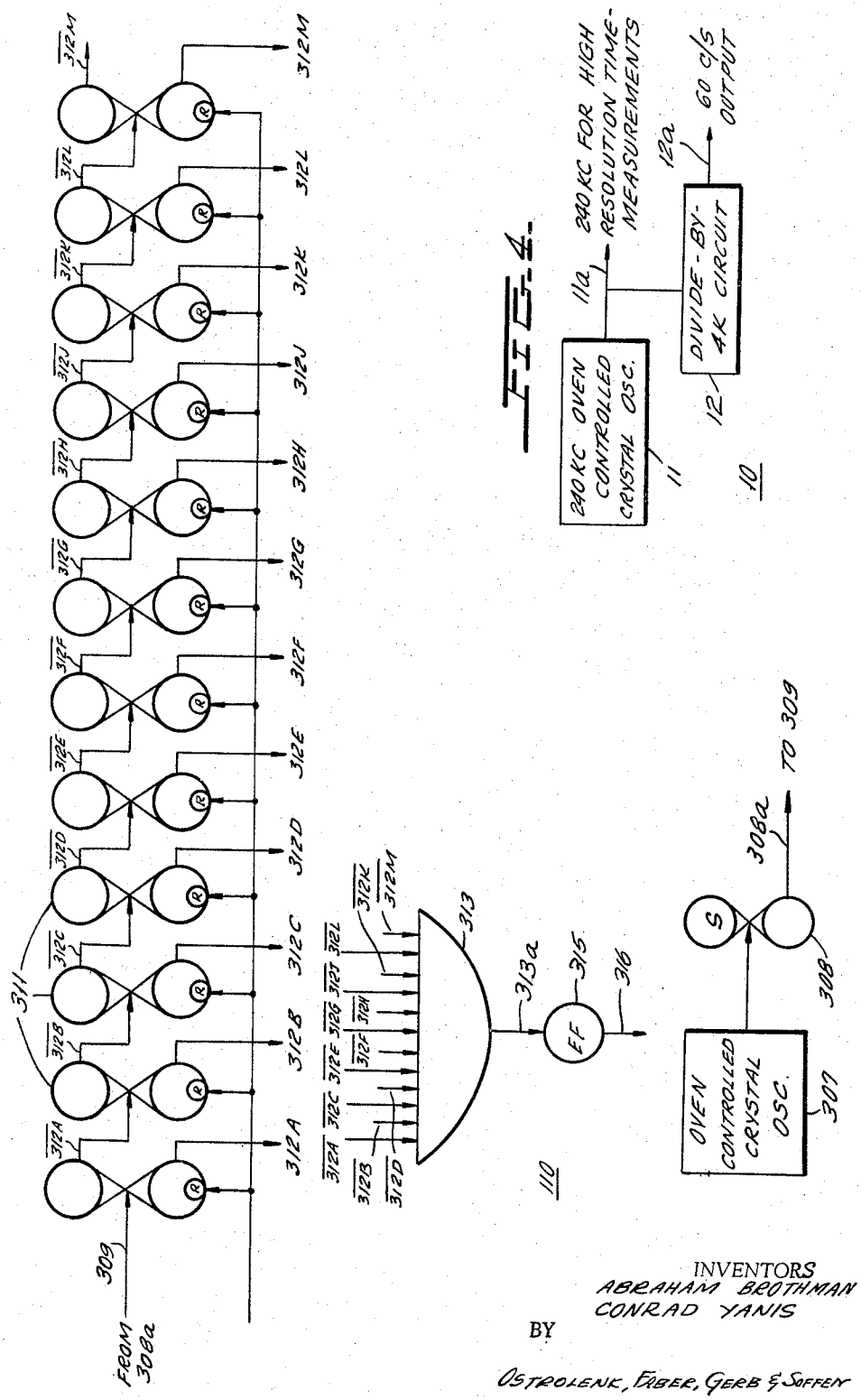

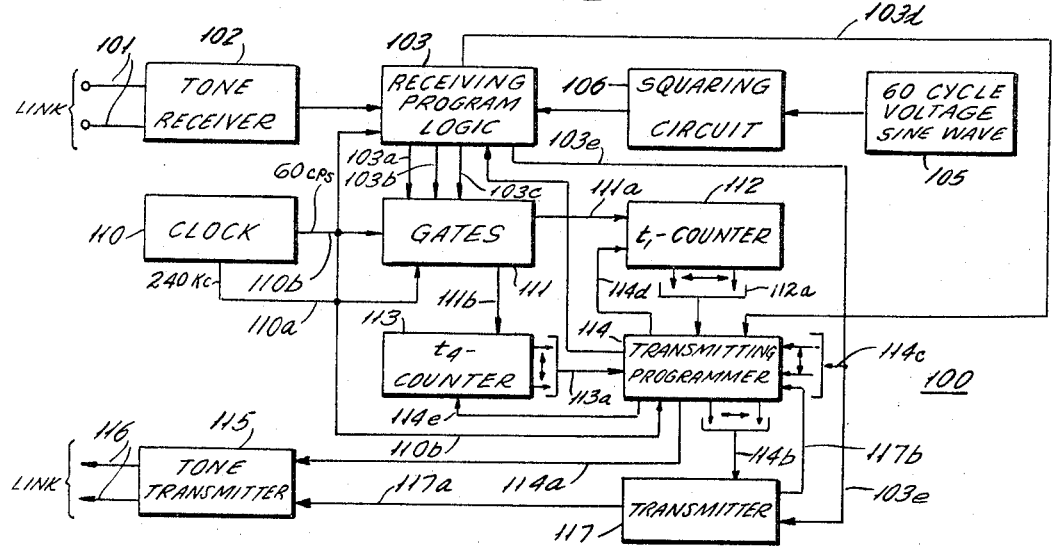
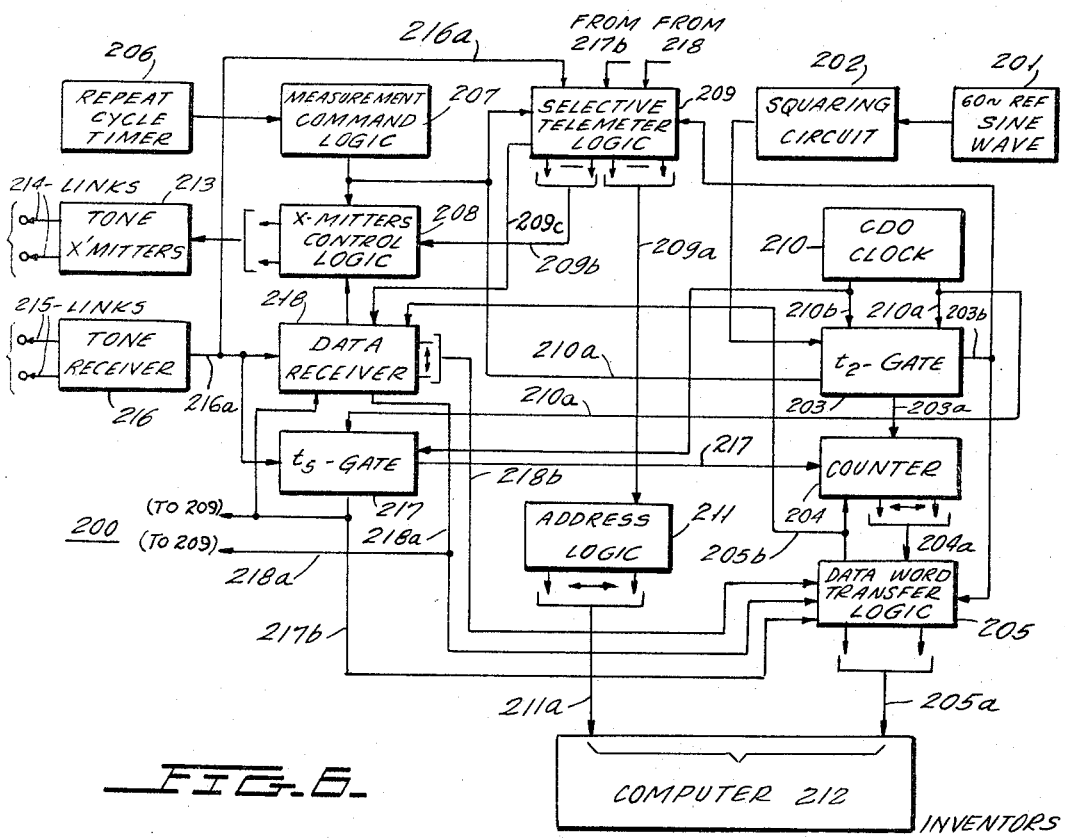

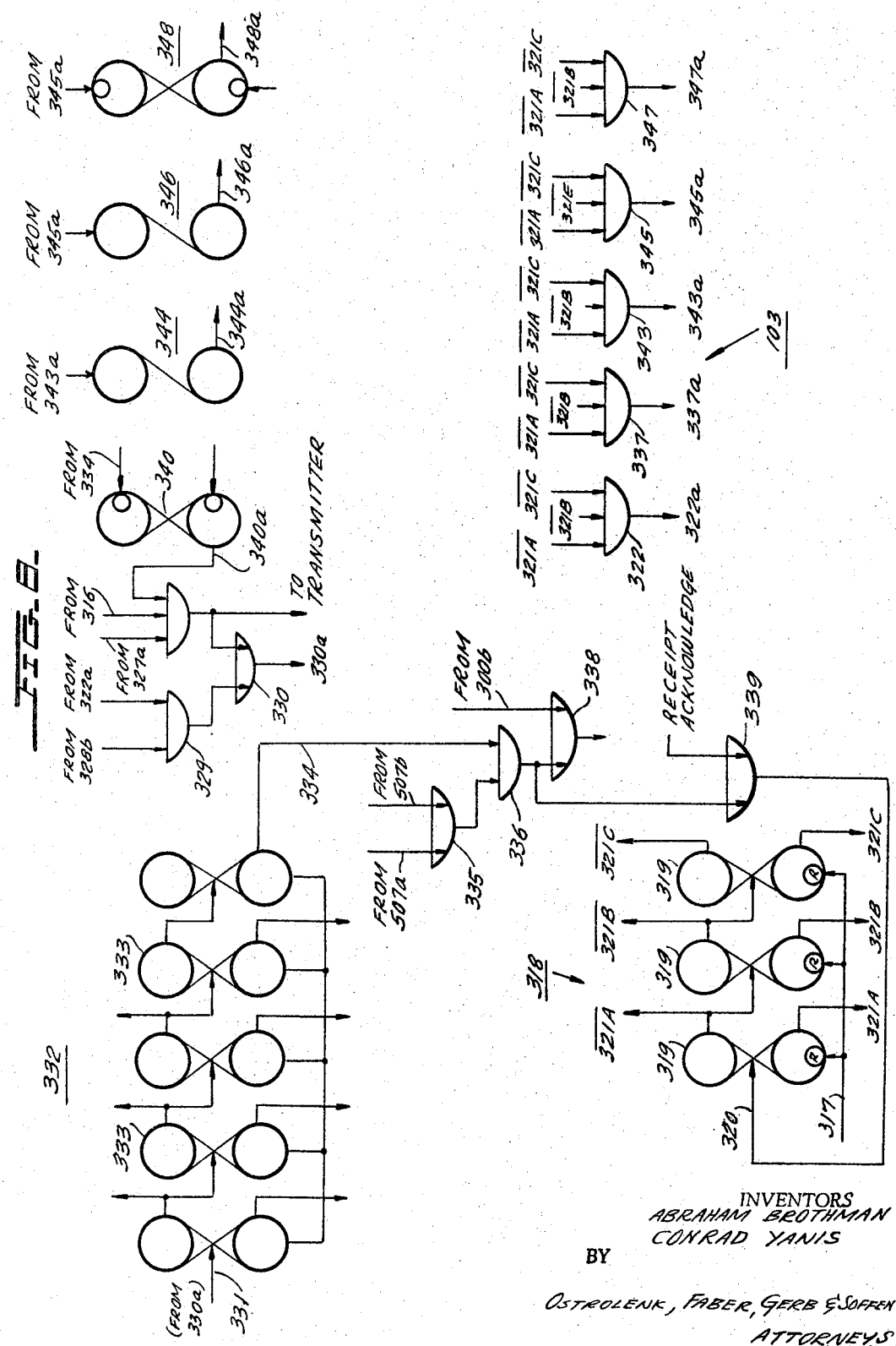

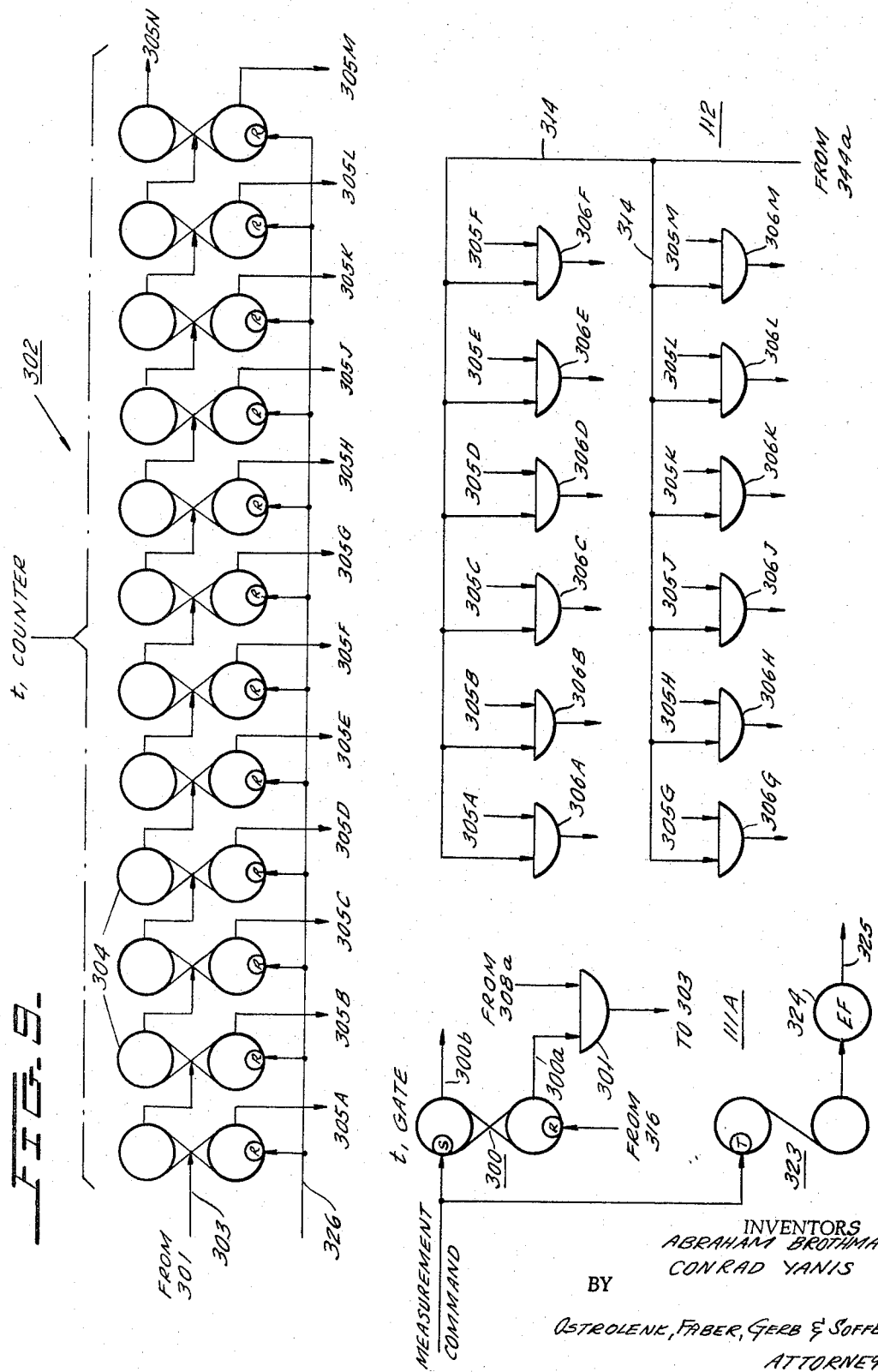

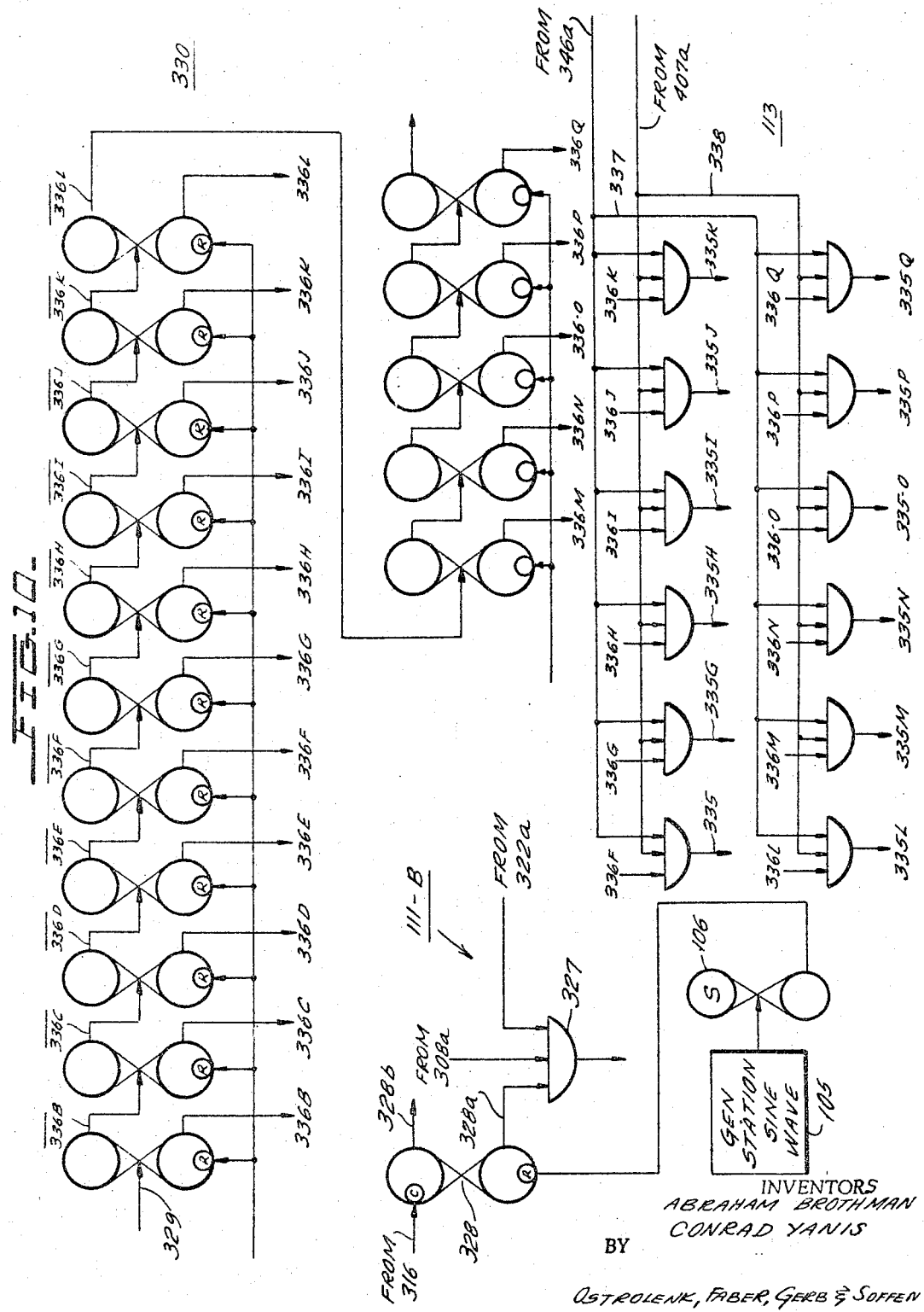

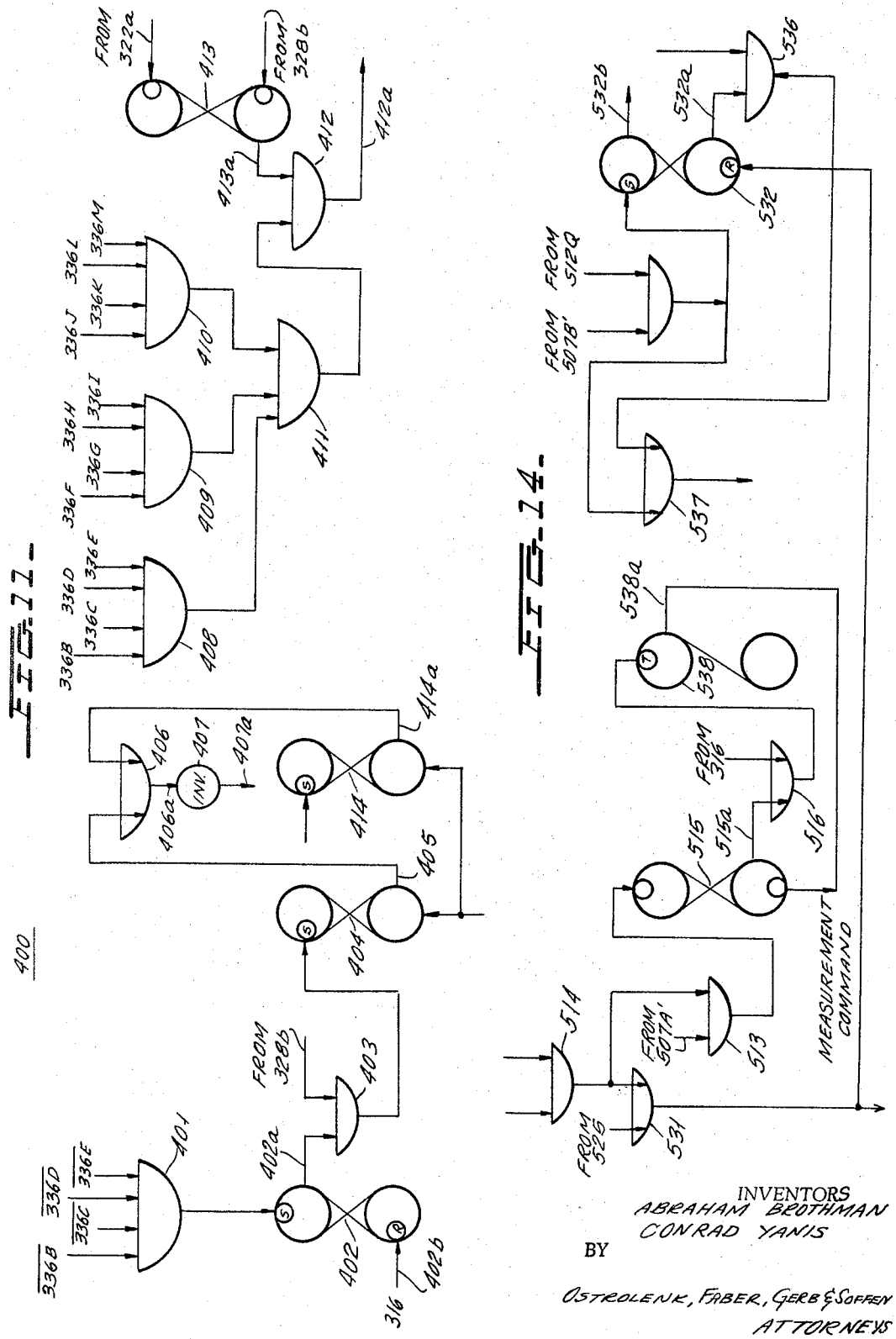

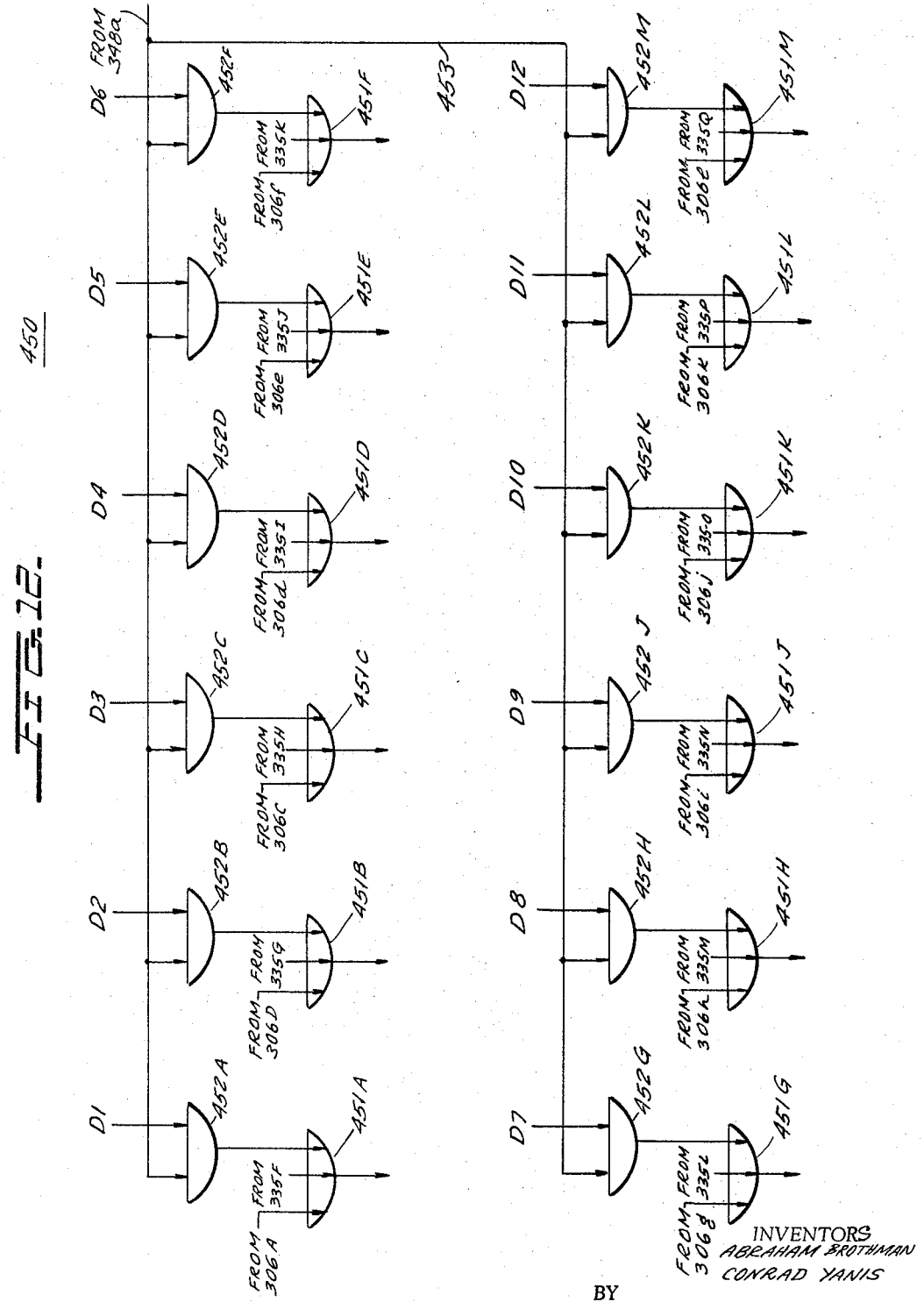

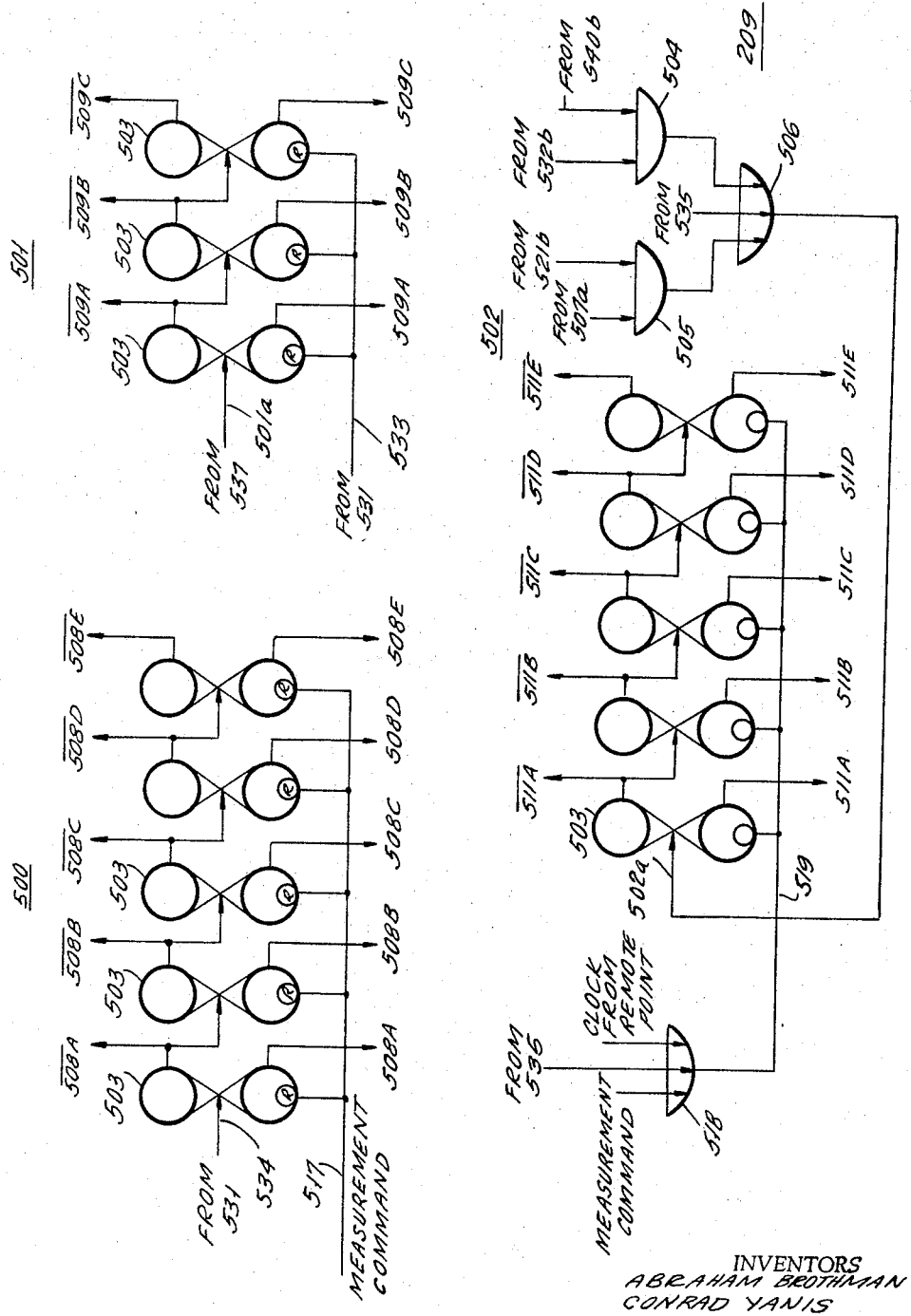

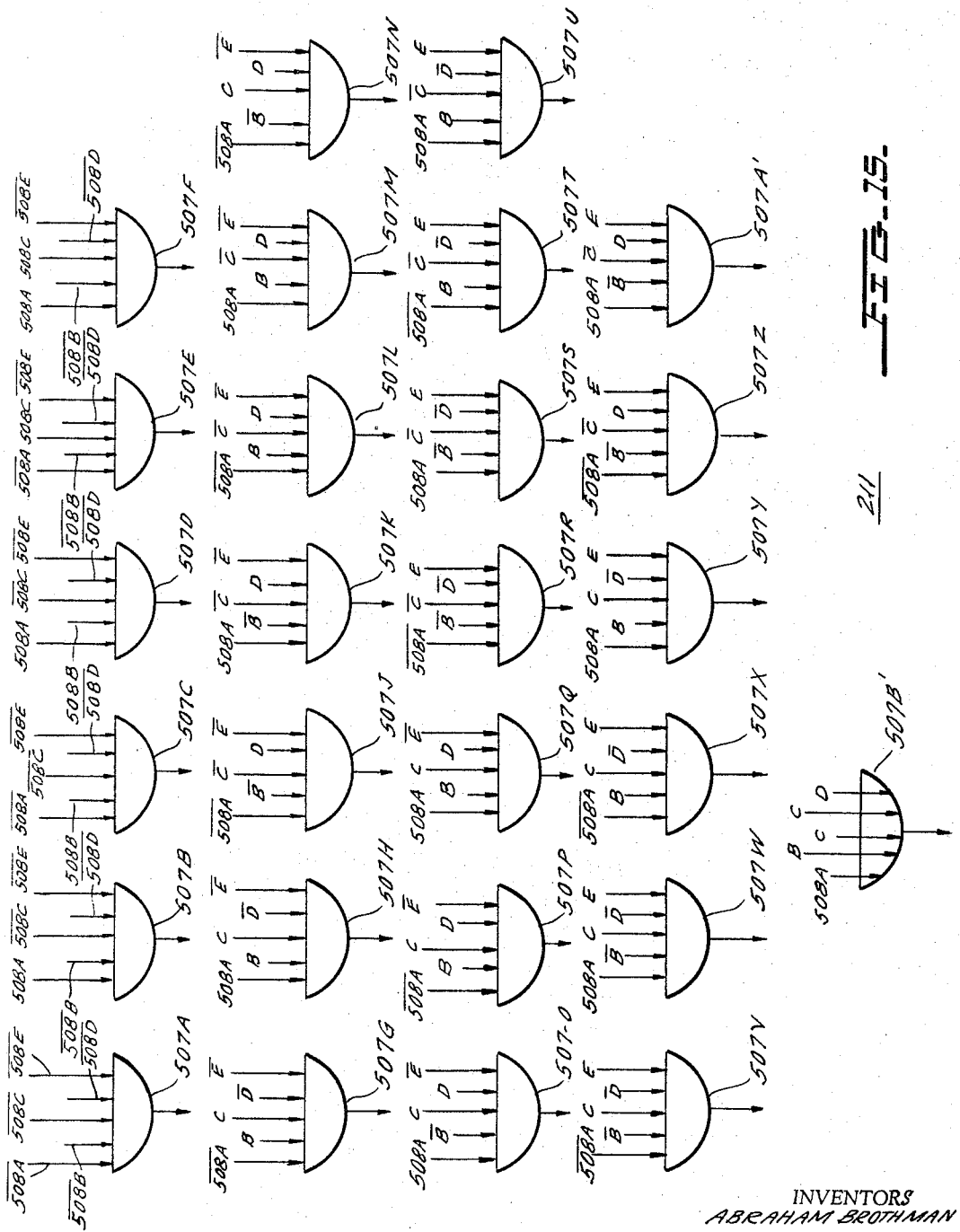

May 7, 1968  A. BROTHMAN ET AL  3,382,483

TELEMETERING SYSTEM FOR DETERMINING PHASE ANGLE

Filed Oct. 30, 1963  15 Sheets-Sheet 11

FIG. 16.

INVENTORS
ABRAHAM BROTHMAN
CONRAD YANIS
BY
OSTROLENK, FABER, GERB & SOFFEN
ATTORNEYS

FIG.18.

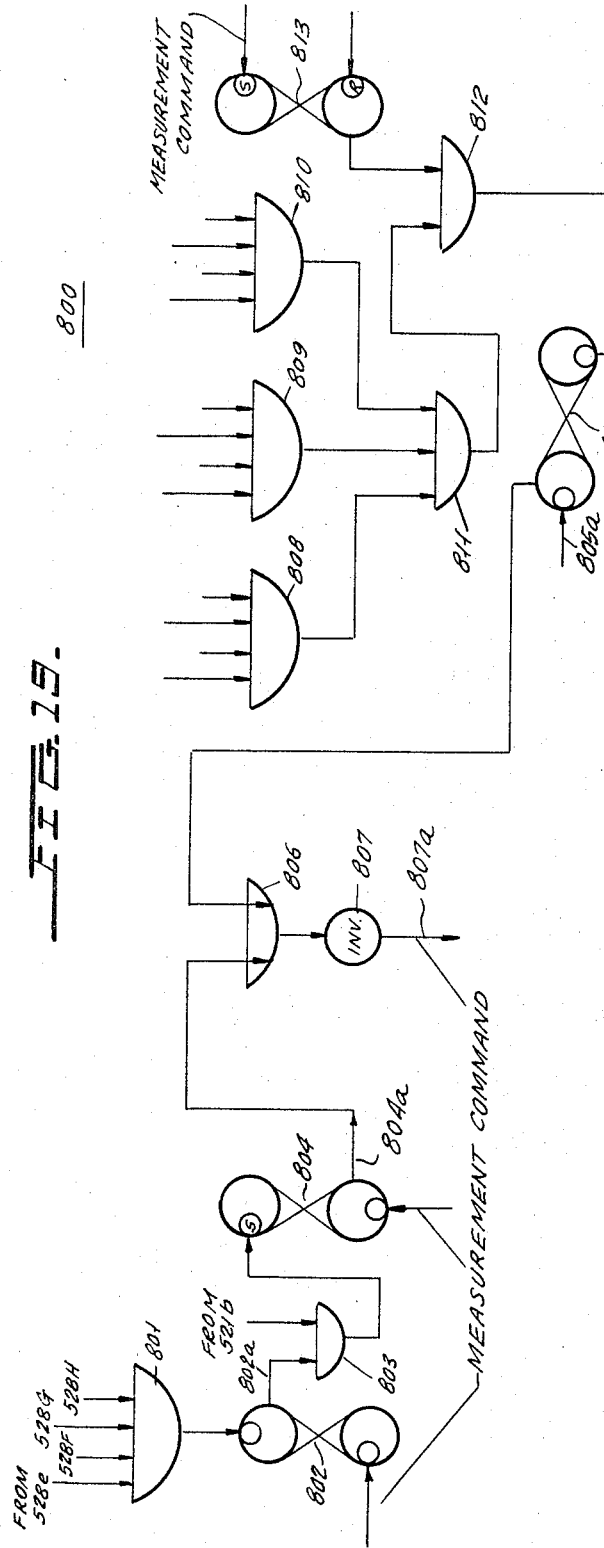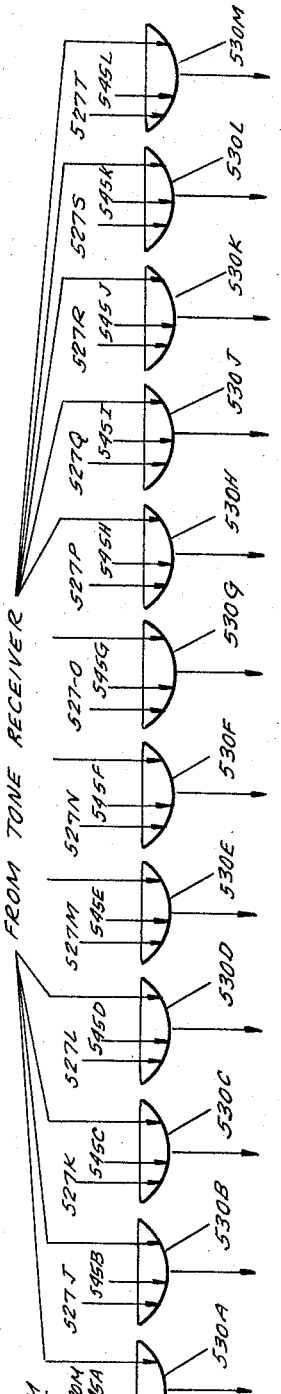

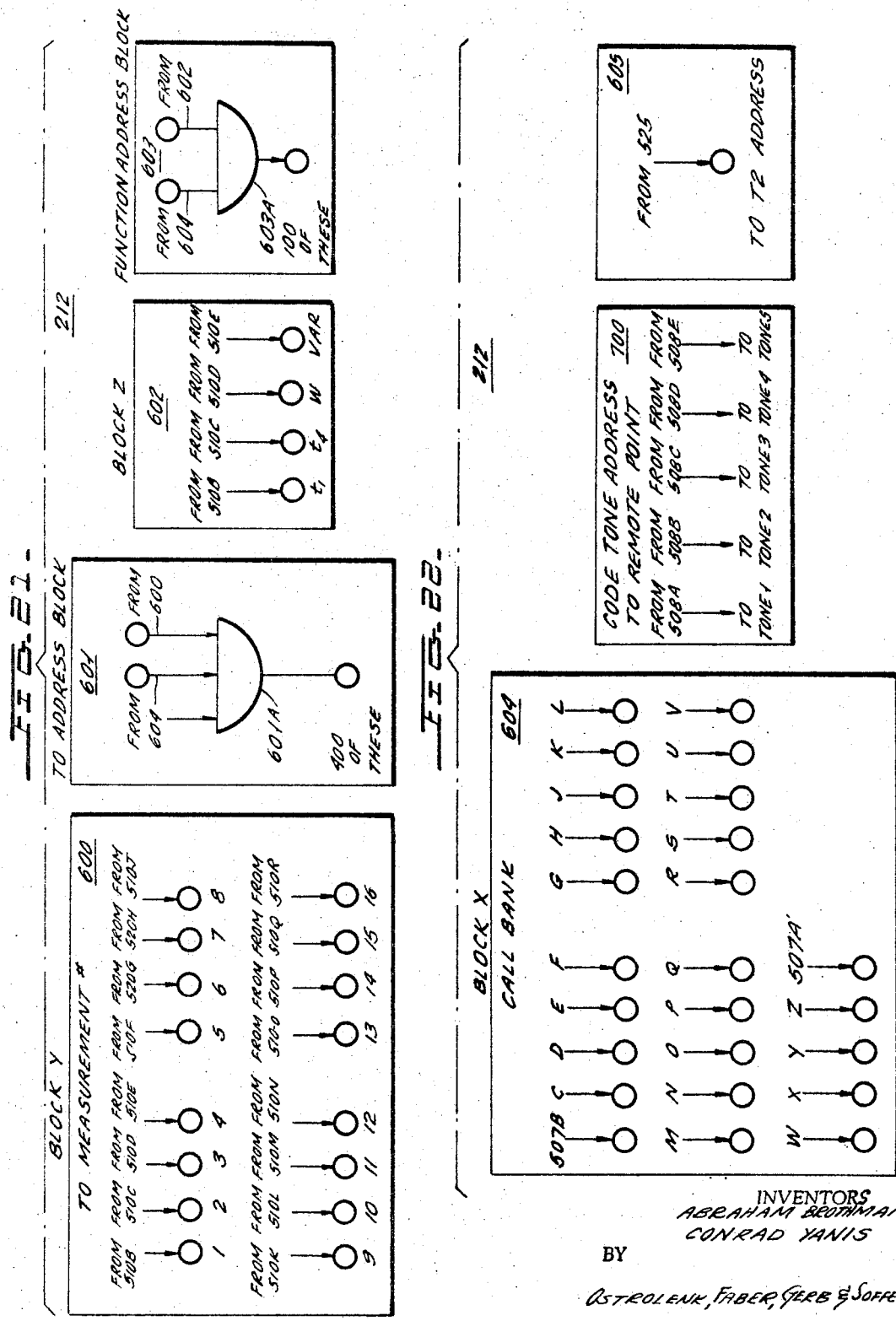

United States Patent Office 3,382,483
Patented May 7, 1968

3,382,483
TELEMETERING SYSTEM FOR DETERMINING PHASE ANGLE
Abraham Brothman, Dumont, and Conrad Yanis, Glen Rock, N.J., assignors, by mesne assignments, to Sangamo Electric Company, Springfield, Ill., a corporation of Delaware
Filed Oct. 30, 1963, Ser. No. 320,162
21 Claims. (Cl. 340—151)

ABSTRACT OF THE DISCLOSURE

This invention teaches a system for use in power distribution networks typically employing a plurality of generator sources and loads interconnected in the system network wherein it is desired to effect economic dispatch of energy in the system by suitably adjusting the system generators. In order to effect economic dispatch it is necessary to measure phase angle as between a central point in the power network and the plurality of remote points. This is performed by initiating a measurement command signal at the central location causing each remote point to generate a phase angle measurement indicating the phase angle between receipt of the measurement command signal and the beginning of the next 60 cycle sine wave of the system network at that point. Additional means are provided at each remote point for measuring the phase angle between the network sine wave and a highly accurate clock source operating at the same frequency.

Simultaneously therewith the central point generates a phase angle measurement between the initiation of the measurement command signal and the beginning of the next cycle in the power distribution network at that point. In addition thereto, the central point generates a second phase angle measurement between a local frequency generator and the beginning of each cycle of the network signal at that central point.

A transmit request signal is sent sequentially to each of the remote points which then transmit the phase angle measurements generated at each remote point. The phase angle measurements are then applied to a computer for establishing the actual phase angle between the voltage signal at the central point in the power distribution network with the signal at the remote point in the power distribution network in order to arrive at a solution for the economic dispatch of power in the network which employs the phase angle measurement as one piece of data used in solving the economic dispatch equation.

---

This invention relates to telemetering systems, and more particularly to equipment for use in telemetering systems wherein the phase angle relationship between two remote sine waves in a power distribution network may be automatically calculated for the purpose of carrying out the economic dispatch of power throughout the power distribution network.

As regards power distribution networks, in order to optimize the economic dispatch of power throughout the system and to minimize the cost of the total energy introduced into the system, it is necessary to continuously calculate and coordinate the system generating costs and the transmission losses throughout the network. In one preferred method for carrying such economic dispatch of energy throughout the system, the dispatch of energy is based upon the basic economic dispatch equation which is:

$$\frac{\partial c}{\partial P} + \lambda \frac{L}{P_T} = \lambda \quad (1)$$

where:

$\partial c / \partial P$ = the cost per unit of power at a generator
$\partial L / \partial P_T$ = the losses in transmission per unit of transmitted power
$\lambda$ = the incremental cost per unit of delivered power If Equation 1 is rearranged to the form $$\frac{\frac{\partial c}{\partial P}}{1 - \frac{\partial L}{\partial P_T}} = \lambda \quad (2)$$

The necessary data for the cost per unit of power at a generator is readily available as emperical data or emperically corrected rational equations, and is most often presented in graph or nomograph form. Thus in order to calculate $\lambda$, it is still necessary to calculate the term $$\frac{\partial L}{\partial P_T}$$

which can be obtained from the equation $$\frac{\partial L}{\partial P_T} = \frac{2 \tan \phi}{\tan \phi + \frac{X}{R}}$$

where:

$R$ = the resistive components of the transmission line
$X$ = the reactive components of the transmission line
$L$ = the loss in power on the transmission line
$\phi$ = the phase angle between the voltage sine waves at the transmitting and receiving points.

We need only to obtain the phase angle $\phi$ in order to calculate $\lambda$ which is based on the assumption that it is possible to fix the X and R components of each transmission line.

Since the loads on any power distribution system may change continuously and also may change in a random fashion, it is necessary to update all of the required information needed to solve the basic economic dispatch equation. This, therefore, necessitates the provision of means for continuously providing the phase angle relationship between any two points being measured in the system such as, for example, between a generating point and a remote load point in the system, during sufficiently frequent intervals, in order to adequately maintain an economic dispatch of power throughout the distribution system.

The instant invention provides telemetry system equipment which automatically calculates the phase angle between two remotely disposed voltage sine waves, which phase angle information is then readily made available for the purpose of solving the basic economic dispatch equation.

The instant invention is comprised of telemetry equipment provided at each generator point and load point within the power distribution system wherein the total number of locations is dependent only upon the needs of the user and the size of the network. While such systems may have a plurality of generator points and likewise a plurality of load points located throughout the network, the following basic description will refer to only one such generator location and one such load point for the purpose of simplicity. The generator location is provided with an accurate clock source capable of generating clocking pulses every 1/60 of a second with the clock source having a maximum drift characteristic of $10^{-9}$ cycles per second in any one second. The generator location having this clock source will be hereinafter referred to as "the central dispatch office location." The load point, or remote location, is likewise provided with a clock source of characteristics substantially identical to that provided at the central dispatch office.

At the instant at which a phase angle relationship between the central dispatch office and the remote location is desired, which instant will be considered to be the interrogation time, a single clock pulse is transmitted from the central dispatch office to the remote location. The remote location, upon receipt of the single clock pulse, generates, through suitable counting means, the time between the receipt of the single clock pulse and the next clock pulse generated at the remote location. Further means are provided at the remote location for measuring the phase relationship between the remote location clock pulse and the termination of the next 60 cycle voltage sine wave occurring thereafter.

During the time at which these two phase relationships are being generated at the remote point, the central dispatch office measures the phase relationship between the interrogation clock pulse transmitted from the central dispatch office and the termination of the next 60 cycle voltage sine wave at the central dispatch office. After the termination of at least two cycles of the 60 cycle voltage sine wave at the remote point, the remote point then transmits a clock pulse to the central dispatch office which is provided with means for determining the phase relationship between the receipt of this clock pulse and the next clock pulse which is generated at the central dispatch office. The generation of all of the above mentioned phase relationships occurs within a fraction of one second.

In addition to the phase angle relationships recited above, two other relationships are needed in order to perform the phase angle calculation. These are the delay time in the transmission of the clock pulse from the central dispatch office to the remote point and the delay time in transmission of the clock pulse from the remote point to the central dispatch office. Whereas in the ideal case these two delay times may be identical, as a practical matter, one of the delay times may be greater than the other due to a variety of reasons among which are: the fact that the use of different frequencies for the two information directions favors the more rapid recognition of the higher frequency; the possibility of the differences in the response speeds of the transmitter and receiver equipment facilities at both locations; the possibility of setting up different threshold levels as between the two locations; and the possibility of differences in the effective band pass of the two information channels, to mention just a few factors which cause the two delay times to be unequal.

Thus, in order to ascertain the value of the delay times, this is done by assigning to one of the delay times a weighting factor representative of the fact that the two delay times are unequal, and by calculation of the value of the weighting factor both delay times may then be calculated.

The weighting factor is calculated very readily by determining the phase delay time between the receipt of the central dispatch office clock pulse and the first complete voltage sine wave cycle at the remote point and the phase delay between the receipt of the remote point clock pulse and the next complete voltage sine wave at the central dispatch office and setting these values into the equation for the weighting factor. Once the value of the weighting factor has been determined, its value may be employed to ascertain the value of the time delay which occurs in the transmission of the clock pulse between the two remote locations, which value is then utilized in the equation for calculating the phase angle between the two voltage sine waves of the central dispatch office and the remote point.

In order to assure the accuracy of the phase angle measurements at the remote point, which accuracy may be effected by the remote point electronic hardware, a plurality of such measurements are taken during one measurement cycle and then averaged. The averaged measurements are employed to obtain the RMS values of these measurements in order to obtain the values of the constants appearing in the phase angle equations which are fully set forth in the detailed description of the invention. All calculations are performed by the central dispatch office computer.

From a hardware viewpoint, the remote point is comprised of suitable receiving means capable of identifying an interrogation request received from the central dispatch office. Means are provided for initiating a count upon receipt of the interrogation request, which count represents the time between receipt of the interrogation request and the end of the first voltage sine wave cycle at the remote point. Additional counting means are provided at the remote point for initiating a count representative of the first remote joint clock pulse occurring after the receipt of the interrogation request and the termination of the first voltage sine wave cycle occurring thereafter.

The central dispatch office location is provided with suitable data receiving means for collecting the data transmitted from the remote point. In addition thereto, the central office is provided with suitable counting means for generating a count representative of the time between the interrogation pulse transmitted to the remote point and the first completed cycle of the 60 cycle voltage sine wave at the central dispatch office location. Further counting means are provided for generating a count representative of the time between the receipt of the clock pulse transmitted by the remote point and the termination of the next 60 cycle sine wave at the central dispatch office location. These counts, coupled with the data gathered from the remote point, are then inserted into suitable computer means at the central office location for the purpose of first calculating the weighting factor, then calculating the delay time between the transmission and receipt of an interrogation pulse and ultimately the calculation of the phase angle between the voltage sine waves at central dispatch office and remote point locations. The phase angle value calculated is then available for use by the power distribution network in maintaining the most economical dispatch of energy throughout the entire power network.

It should be understood that although only one central dispatch office location is employed for a power distribution network, as many remote points as are required may be provided with the means for generating the counts described hereinabove with the number of remote points being so equipped being dependent only upon the needs of the particular system.

In the system's arrangement the central dispatch office is provided with means for simultaneously transmitting a measurement command signal to all of the remote points in the power grid. Each remote point is provided with means of the type described above for generating the necessary measurements. The central dispatch office location is provided with further means for sequentially interrogating the individual remote points which, in turn, are provided with means for transmitting the counts representing the phase angle measurements to the central dispatch office. Computer means are provided at the central dispatch office for calculating the phase angle relationships between the central dispatch office and each remote point. The routine recited above (i.e. that of first the measurement command and then the sequential interrogation request) is repeated a sufficient number of times, for example 50 times, to obtain enough data for averaging the measurements taken. In one typical system example, comprised of a central dispatch office and 25 remote points, a single routine consisting of a measurement command signal followed by 25 sequentially transmitted interrogation request signals, approximately two seconds are required for performance of the entire routine. In order to provide enough data for averaging purposes, 50 such routines are performed in one typical example, thus requiring approximately 100 seconds.

It is therefore one object of the instant invention to provide a novel telemetry system for measuring the phase angle between voltage sine waves at two distant locations.

Another object of the instant invention is to provide a novel telemetry system for measuring phase angle relationships between voltage sine waves at two remote locations, which system provides novel means for taking into account the difference in phase delays in the transmission of interrogation pulses which may exist as between transmitting information from a first location to the second, and transmitting information from the second location back to the first.

Another object of the instant invention is to provide a novel telemetry system for determining the phase angle relationships between voltage sine waves at two remote locations wherein each of said locations are provided with independent clock pulse sources upon which the necessary readings are based.

Still another object of the instant invention is to provide a novel telemetry system for measuring the phase angle relationship between voltage sine waves at two remote locations wherein the phase angle relationship may be calculated without any necessity whatsoever for bringing the two clock pulse source at each of said locations into synchronism.

Another object of the instant invention is to provide a novel telemetry system for measuring the phase angle relationship between voltage sine waves at two remote locations wherein the measurements taken are completely independent of the delay time which occurs in the transmission of data between two remote locations.

Still another object of the instant invention is to provide a novel telemetry system for measuring the phase angle relationship between voltage sine waves at two remote locations wherein any deviations from the readings compiled at the remote locations which lie beyond the maximum limit which can be expected for such deviations are discarded as not being a valid information set so as to avoid the use of an atypical situation.

Still another object of the instant invention is to provide a novel telemetry system for determining the phase angle relationship between voltage sine waves at two remote locations, which phase angle relationship may be readily employed for the purpose of maintaining the economic dispatch of energy in a power distribution system.

These and other objects of the instant invention will become apparent when reading the accompanying description and drawings in which:

FIGURE 1 is a plot of cost per unit of power at a generator location versus the generation schedule.

FIGURE 2 is a signal diagram employed for the purpose of describing the telemetry system of the instant invention.

FIGURE 3 shows a plurality of waveforms depicting the delays which occur in the transmission of a square pulse.

FIGURE 4 is a block diagram showing the clock utilized at the central dispatch office at each remote point.

FIGURE 5 is a block diagram showing the telemetry equipment employed at each remote point.

FIGURE 6 is a block diagram showing the telemetry equipment employed at the central dispatch office.

FIGURE 7 is a logic diagram showing the clock of FIGURE 4 in greater detail.

FIGURES 8–12 are logic diagrams showing the blocks of FIGURE 5 in greater detail with like numerals designating like blocks.

FIGURES 13–22 are logic diagrams showing the blocks of FIGURE 6 in greater detail with like numerals designating like elements.

GENERAL THEORY

Figure 17:
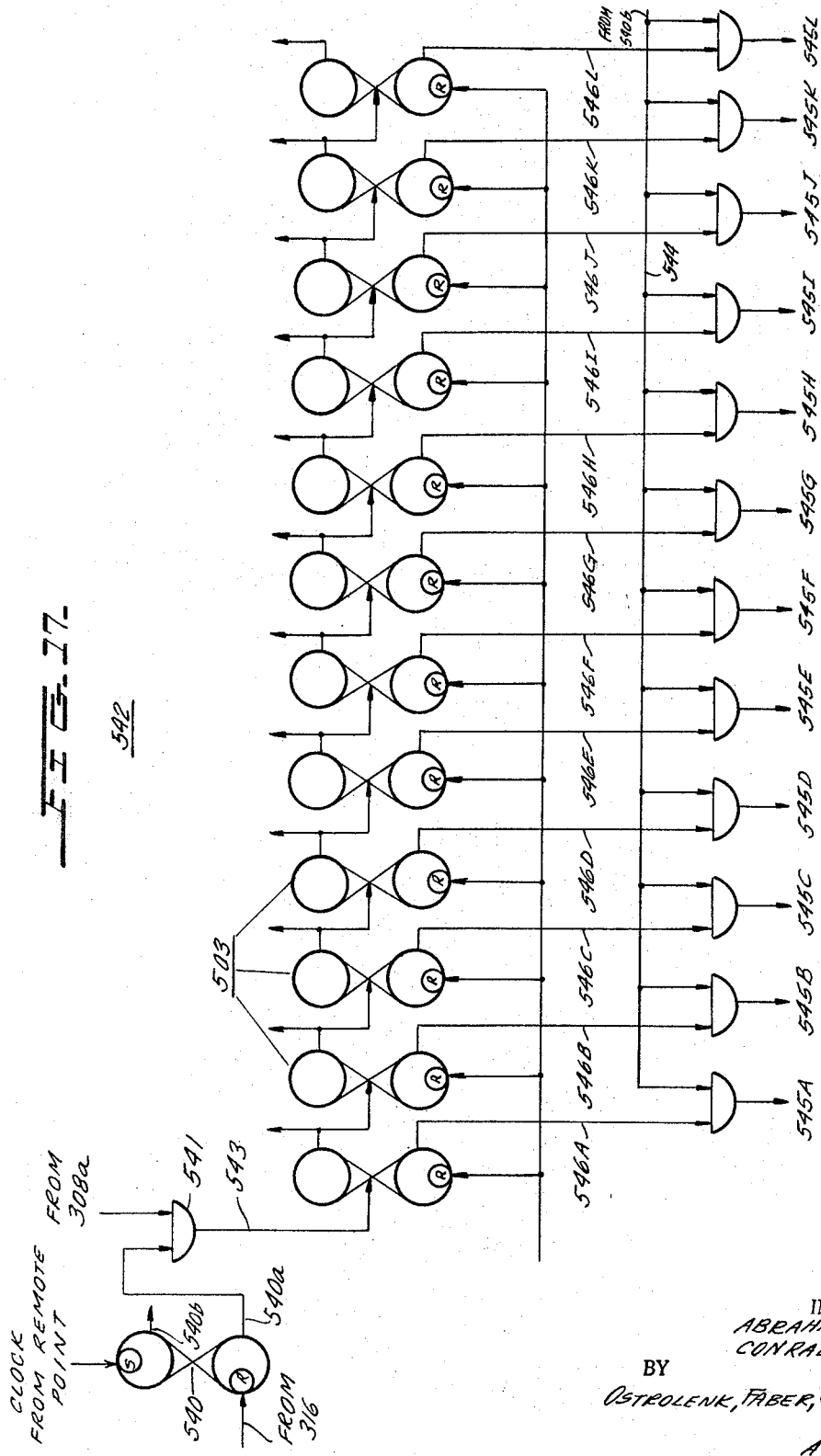

The basic economic dispatch equation is a form of the generalized energy efficiency equation, and is $$\frac{\partial c}{\partial p} + \lambda \frac{L}{P_T} = \lambda \tag{1}$$

where $\partial c/\partial P$ = the cost per unit of power at a generator
$\partial L/\partial P_T$ = the losses in transmission per unit of transmitted power
$\lambda$ = the incremental cost per unit of delivered power.

If Equation 1 is rearranged to the form $$\frac{\frac{\partial c}{\partial p}}{1 - \frac{\partial L}{\partial P_T}} = \lambda \tag{2}$$

Data for $\partial c/\partial P$ for generator sets is usually available as empirical data, or empirically corrected rational equations, and is most often dealt with in graph or nomograph form. Such graphs are plots of $\partial c/\partial P$ versus the generation schedule P such as those shown in FIGURE 1. Frequently, any one generation or installation may have several curves depending on specific conditions of operation of the boiler, vacuum pump and condenser components.

The real problems in economic dispatch, therefore, are:
(1) the means used to identify the transmission losses; and
(2) the methods by which a best $\lambda$, $\lambda_B$, is identified and then made the system $\lambda$.

Telemetered phase angle as a mode of identifying $\partial L/\partial P_T$.

The two basic equations for the transmission of power are the following:

$$P_T = \frac{E_R^2 R}{R^2} - \frac{E_T E_R}{Z^2}(R \cos \phi - X \sin \phi) \tag{3}$$

and $$L = \frac{(E_T^2 + E_R^2)R}{Z^2} - \frac{2E_T E_R \cos \phi}{Z^2} \tag{4}$$

where:
$P_T$ = transmitted power
$E_R$ = the RMS voltage at the receiving point
$E_T$ = the RMS voltage at the transmitting point
$R$ = the resistive components of the transmission line
$X$ = the reactive components of the transmission line
$Z$ = the impedance of the transmission line
$L$ = the loss in power on the transmission line
$\phi$ = the phase angle between the voltage sine waves at the transmitting and receiving points.

Holding $(E_T)$, $(X, Z, R)$ and $(E_R)$ to be constants, we obtain from Equation 3:

$$\frac{\partial P_T}{\partial \phi} = \frac{E_T E_R}{Z^2}[R \sin \phi + X \cos \phi] \tag{5}$$

and from Equation 4, again by a differentiation with respect to $\phi$:

$$\frac{\partial L}{\partial \phi} = \frac{2 E_T E_R R \sin \phi}{Z^2} \tag{6}$$

By application of the chain rule to Equations 5 and 6, we arrive at:

$$\frac{\partial L}{\partial P_T} = \left(\frac{\partial L}{\partial \phi}\right)\left(\frac{\partial \phi}{\partial P_T}\right) = \frac{\partial R \sin \phi}{R \sin \phi + X \cos \phi} = \frac{\partial \tan \phi}{\tan \phi + \frac{X}{R}} \tag{7}$$

Equation 7 thus presents the $\partial L/\partial P_T$ factor of Equation 1 as a function of X, R and $\phi$; and, for small values of $\phi$ (i.e. $0 \text{K} \phi \text{K } 0.175$ radians), is virtually $$\frac{\partial L}{\partial P_T} = \frac{\partial \phi}{\phi + \frac{X}{R}} \tag{8}$$

where $\phi$ is expressed in radians. Were it possible to measure and telemeter the phase angle $\phi$, and were it possible to fix the X and R components of each transmission line, it would then seem that there exists an extremely direct method of identifying $\partial L/\partial P_T$.

The purpose of the phase angle telemetering system is to individually determine the phase angle of approximately forty interchange and generation points relative to an arbitrarily selected central dispatch office reference.

The system is comprised of any number of interconnected stations in a power grid. The phase angle measurement and telemetry system of the instant application is a highly accurate means of establishing the phase angle which each station makes with a central dispatch office reference sine wave. The system methods for accomplishing this purpose involve:

Simultaneous transmission of measurement commands from the central dispatch office to all remote stations.

Measurement sequences at the central dispatch office and at each remote station whenever the central dispatch office issues a measurement command.

Telemetering of the remote station measurement data to the central dispatch office on a selective request basis in which each remote station is interrogated in turn for its stored data.

Computation sequences in which the system-wide measurement data is processed to yield the final phase angle data.

The measurement command and telemetering functions of the system can be accommodated to low bandwidth links and do not involve links of special properties or special terminations.

Accuracies of the order of + or −0.5° of phase angle measurement are possible, justifying the use of the data in load flow analysis and economic dispatch applications.

The central dispatch office in all remote stations are equipped with high accuracy "clocks" of the type shown in FIGURE 4. Each such clock, 10, is comprised of an oscillating means designed to operate at 240 kc. One preferred type of such an oscillator is an oven controlled crystal oscillator and it should be understood that any other suitable oscillator may be employed. The output 11a of oscillator 11 is first provided for the time measurements and simultaneously therewith is impressed upon a divide by 4000 circuit 12, which divides the 240 kc. output of oscillator 11 to provide pulses at a repetition rate of 60 cycles per second at its output terminal 12a. The clocks 10 are used to determine the phase angle which the reference sine wave makes with a 60 cycle output of the central dispatch office clock and to measure the phase angle which the remote station sine wave makes with the 60 cycle output of the remote station clock and further, to perform time measurements on transmitted interclock signals by which clock-to-clock relationships are determined.

The manner in which such measurements are made are illustrated in FIGURE 2.

In FIGURE 2, let:

Vertical lines $i$–$v$ on line A represent the successive times on a remote station voltage sine wave (60 cps.) at which $$wt. = 0, 2\pi, 4\pi, 6\pi, 2n\pi$$

where $n$ is an integer;

Vertical lines $a$–$e$ on line B represent the 60 cycle output of a remote station clock 10;

Vertical lines 1–5 on line C represent the corresponding 60 cycle output of the central dispatch office clock;

Vertical lines I–V on line D represent the times on the reference sine wave at which $$wt. = 0, 2\pi, 4\pi, 6\pi, 2n\pi$$

where $n$ is an integer;

and let all of the above be true with respect to the indicated time $t=0$.

At time $t=0$, the central dispatch office clock pulse, 1, of line C, is transmitted on a simultaneous system-wide basis to all remote stations. This pulse has the significance of a measurement command typically at the indicated remote station, causing the received measurement command to trigger off two measurements. The first measurement is indicated by $t_1$ of line B, while the second measurement is $t_4$ indicated in line A, $m$ successive measurements being made of the quantity $t_4$. At the central dispatch office beginning with clock pulse 2 of line C, $m$ successive measurements of the quantity $t_2$ of line C are made. At the remote stations and at the central dispatch office the indicated measurements are stored in suitable memory means provided therefor. In the instances of both the $t_2$ and $t_4$ measurements, the purpose of the iterated measurements is to minimize the weight of discrepant determinations. With a sufficient allowance in time for the specified measurement sets to be concluded, the central dispatch office begins a station-by-station data collection sweep. The requested telemeter cycle from each remote station consists of the stored $t_1$ measurement, the stored average of the $m$ measurements of $t_4$ and finally, a transmission of $n$ successive 60 cycle clock pulses by which the central dispatch office is then enabled to make a corresponding number of $t_5$ measurements indicated on line C.

The significance of each of the various specified measurements are best illustrated by the quantitative relationships into which they enter. Thus, if D designates the displacement between the central dispatch office clock and any one remote station clock, and if $t_3$ designates the transmission delay associated with receipt of the measurement command by the remote station, D is defined as $$D = \frac{1}{60} - (t_1 + t_3)$$

In addition to the above, where $bt_3$ designates the transmission delay characterizing the transmission of a Remote Station 60 cycle "clock"-pulses to the central dispatch office, the displacement D is also defined by:

$$lt_3 + t_5 - \frac{1}{60} = D$$

If we then define the phase angle ($\phi$) between the "reference sine wave" on line D of FIGURE 2 and the Remote Station "voltage sine wave" on line A by $$W_5 (t_6 - t_2) = \phi$$

where $W_5$=the system's angular frequency. It is clear that:

$$t_6 = t_4 - D$$

On close inspection, Equations 1 through 4 are in and of themselves of little direct value since any straightforward solution of these equations depends on knowledge of the transmission delays $t_3$ and $bt_3$. While $t_3$ and $bt_3$ can be identified to a satisfactory order of exactness, the methods of accomplishing these ends involve statistical treatment of Equations 1 through 4. In turn, the statistical treatment places a high order of dependence on properties of the central dispatch office and remote station "clocks" which are dealt with in the next section.

*The central dispatch office and remote station clocks*

The "black box" diagram of the central dispatch office and remote station "clocks" is shown in FIGURE 4. For the purposes of the phase angle measurement and telemetering system, the oscillator-member of these "clocks" has a maximum drift-characteristic of $10^{-8}$ in any second and each offers a measurement refinement (resolution) of 4.2 microseconds. The maximum "clocking"-error, exclusive of "clock"-drift, is thus 4.2 microseconds in any one measurement operation. Relative to a phase angle determination accuracy of ±0.5 degrees, or $$\frac{0.5}{360}\left(\frac{1}{60}\right) = 23.1 \text{ microseconds}$$

the maximum "clocking" error leaves a margin of $$23.1 - 4.2 = 18.9 \text{ microseconds}$$

for inter-"clock" drift. At a $10^{-8}$ second drift property, this would mean that $$\frac{18.9\ (10^{-6})}{2\ (10^{-8})} = 945 \text{ seconds}$$

would be the minimum time required for any two clocks to "runout" by the amount of the specified leeway. At the high iteration rate of the phase angle measurement and telemetering system, this minimum "runout" time permits the collection of a sufficient amount of data for statistical credance.

Most importantly for the system, "clocks" of the proposed refinement, accuracy, and drift properties will permit the following logical assumptions:

(a) That the $\frac{1}{60}$ second quantities in Equations 1 and 2 merit treatment as constants, and (b) That the displacement quantity D of Equations 1 and 2 may also be treated as constants within any one "runout interval" of the inter-"clock" relationships.

*A statistical perspective of transmission delays*

FIGURE 3 illustrates the constituent factors which enter into transmission delays such as $t_3$ and $bt_3$. These are: $t_p$, the source-to-sink propagation time; $t_D$, the cumulative input-to-output delays of the transmitter, the link; and the information-envelope receiver; and, $t_r$, the delay involved in the development of intersection between a pulse's envelope and a fixed detection-threshold. In general, any source of delay $t_i$ can be adequately and correctly represented by: $t_i = t_a n_i$ where: $n_i$=the angular retardation of the information; and, $t_a$=the period for $2\pi$ radians of the information carrier. And it then follows if the information path consists of ($s$) discrete elements, information transfer points, amplifiers, etc., the overall delay T is then represented at any one time by:

$$T = t_a \sum_{i=1}^{s} n_i = t_a N$$

where:

$$\sum_{i=1}^{s} n_i = N$$

Since all values $n_i$ are subject to Gaussian deviation from center-values, T's "best value," $\overline{T}$, is a weighted average of all specific determinations of T to:

$$\overline{T} = \frac{\sum_{i=1}^{x} T_i}{x} = \frac{t_a \sum_{i=1}^{x} N_i}{x} = t_a \overline{N}$$

where:

$$\frac{\sum_{i=1}^{x} N_i}{x} = \overline{N}$$

By these considerations, where the subscripts ($j$) denote the pertinent parameters for the $t_3$-delay in FIGURE 3 and the subscripts ($k$) denote the corresponding parameters for the $bt_3$-delay, then $$\overline{t}_3 = t_j \overline{N}_j$$

and $$\overline{bt}_3 = t_k \overline{N}_k = bt_j \overline{N}_j$$

where:

$bi$ is a non-zero constant which identifies the instantaneous ratio of transmission-delays in the two directions;

$\overline{t}_3$=the mean value of the transmission delay in the interrogation direction $\overline{bt}_3$=the mean value of the transmission delay in the data telemetering direction. Recalling Equations 1 and 2 in the light of the "Clock Specifications" and Equations 5 through 9, we may write $$dt_3 = dt_1$$

and $$bdt_3 = -dt_5$$

Where $\overline{t}$ designates the mean value of a large sample of $t_1$ measurements, Equation 10 may be put:

$$|\overline{t}_3 - t_3| = -[\overline{t}_1 - t_1]$$

By identity laws, it then follows that $$\sum^{x} \frac{|\overline{t}_3 - t_3|^2}{X} = -\sum^{x} \frac{|\overline{t}_1 - t_1|^2}{X}$$

or $$Pt_3^2 = Pt_1^2$$

in a $t_1$-measurements set. It then follows by symmetry that $$b^2 Pt_3^2 = Pt_5^2$$

And, finally, the division of Equation 5 by 4 we arrive at $$\frac{bPt_3}{Pt_3} = \frac{Pt_5}{Pt_1} = b$$

Eliminating the quantity D between Equations 1 and 2, and combining the result with Equation 6, we obtain:

$$\frac{2}{60} - (t_1 + t_5) = t_3 + bt_3 = \left(1 + \frac{Pt_5}{Pt_1}\right) t_3$$

In short, therefore, it is demonstrated that under the conditions provided by the specified "clocks," if the mean values and RMS errors in $t_1$ and $t_5$ measurement sets are kept for the minimum "runout" intervals, a logical means exists for determining the transmission delay associated with any measurement command. More importantly, with this ability to identify $t_3$, the inter-"clock" displacement D in Equation 1 is established, and in-turn the means then exists for an explicit solution of Equation 4, thus enabling calculation of the desired phase angle information from Equation 3.

In order to obtain the RMS error values $Pt_5$ and $Pt_1$ sufficient $t_1$ and $t_5$ measurements are generated. This is done by sweeping all of the remote points in the network a plurality of times. In the preferred embodiment described herein a network having 25 remote points and one central dispatch office is set forth. A complete sweep of all 25 remote points, including both measurement commands and selective telemeter requests, takes approximately two seconds. Approximately 50 such sweeps are performed to provide a sufficient number of $t_1$ and $t_5$ measurements to obtain their RMS values $Pt_1$ and $Pt_5$, respectively. The central dispatch office computer first calculates the $Pt_1$ and $Pt_5$ values for each remote point. Using Equation 19 the value of $t_3$ for each remote point is obtained. Having derived the $t_3$ value for each remote point the computer utilizes Equations 1 through 4 to obtain the phase angle $\phi$ for each point.

To accomplish all of these purposes to the required order of accuracy, it is necessary that certain statistical standards be observed in the measurement of $t_2$, $t_4$, $Pt_1$ and $Pt_5$. In the case of the $t_2$ and $t_4$ measurements, statistical rigor demands a sufficient iterative sampling of these measurements to minimize the effect of discrepant measurements. To some extent and for some purposes, rigor in the case of $t_2$ and $t_4$ measurements also demands that means exist for correcting the measurements for deviations of the system frequency from the 60 cycle theoretical center-value. In the case of the $Pt_1$ and $Pt_5$ determinations, statistical rigor is associated with the updating of the mean values of $t_1$ and $t_5$ measurements to account for inter-"clock" drift and with the development of justifiable standards for casting out $t_5$ and $t_1$ measurements which reflect extraordinary short-term link noise phenomena. These topics are dealt with below:

FIGURE 5 illustrates the equipment 100 employed at any remote station. It should be understood that each such remote station will have such identical equipment and only one such system 100 will be described for simplicity.

At each such station 100 the station's voltage sine wave 105 is impressed upon a precision squaring circuit 106, The squaring circuit may be any suitable circuit for amplifying and limiting the input sinusoidal waveform so as to generate precision square pulses in response thereto. As a result of this squaring circuit action a 60 cycle square wave train is produced at the output of 106, which square wave train has a fixed time displacement from the positive going zero crossing of the input voltage sine wave from sinusoidal voltage source 105.

Measurement commands, selective telemeter requests and data repeat commands are received by the system 100. Upon the receipt of a measurement command the incoming line 101 receives the incoming information and impresses it upon tone receiver 102. The incoming measurement command signals are then impressed upon the receiving program logic circuitry 103 which is comprised of suitable logic circuits, to be more fully described, for the purpose of interpreting and processing incoming commands and forwarding the command signals to the appropriate circuitry in the remote station system 100. Upon receipt of the measurement command the receiving program logic 103 first applies the command via its output 103a to one of the gate circuits designated by the gate circuit block 111. Gate circuit block 111 is comprised of suitable gating circuits for the purpose of both initiating and terminating the operation of the counting circuits of the system 100 in a manner to be more fully described. The appropriate gate circuit receiving the measurement command from output terminal 103a goes to its open gate condition and permits the 240 kc. output of the clock 110, which output appears at its terminal 110a, to be passed through the gate circuitry 111 and its output terminal 111a to the $t_1$ counter 112. This condition persists until the next 60 cycle pulse of the clock 110, which appears at output 110b and causes the gate circuitry 111 to close. The clock circuit 10 is identical to the clock circuitry 10, shown in FIGURE 2a, with the output terminal 110a supplying the 240 kc. output and the output 110b supplying the 60 cycle output signal. Thus, the simultaneous occurrence of the 240 kc. signal, together with the positive going portion of the square wave signal generated by squaring circuit 106, causes the gate circuitry 111 to pass the 240 kc. signal to the input of $t_1$ counter 112. The $t_1$ counter 112 may be any suitable multistage counting means, having sufficient stages to generate a count of at least 4000, which is the number of cycles generated by the clock 110 at its output 110a between each cycle of the 60 cycle square wave train. The receipt of the next 60 cycle pulse of the clock 110 via the output 110b which re-closes the gate circuitry 111, causes the termination of the counting operation in counter 112, with the result being a count representative of the $f_1$ measurement.

Immediately following this measurement, the receiving program logic 103 signals the second of the two gate circuits of circuitry logic 111 for the initiation of $m$ iterated determinations of $t_4$. Each $t_4$ measurement is initiated by means of the 60 cycle clock pulse from output 110b of clock 110, which is impressed upon the receiving program logic 103 at its output terminal 103b, for the purpose of opening the $t_4$ gate in gate circuitry 111. The squared sine wave generated by squaring circuit 106 is impressed upon receiving program logic 103 and appears at its output terminal 103c which impresses the clock upon gate circuitry 111 for the purpose of closing the appropriate gate for the entire duration of an open gate cycle of the $t_4$ circuit. A 240 kc. output of clock 110, appearing at 110a, is passed through the gate circuitry 111, the output 111b, and is impressed upon the $t_4$ counter 113. Counter 113 is any suitable multistage counter having a number of stages sufficient to generate and accumulate a plurality of $t_4$ counts. In the instant embodiment, 16 $t_4$ counts are generated requiring the $t_4$ counter 113 to have a capacity for accumulating a count of approximately 64,000. The $m$ repeated operations of the $t_4$ gate circuit of gate circuitry 111 are summed by the $t_4$ counter 113 and since $m$, for convenience, is always a power value of the base 2, the average value of $t_4$ is available from the output of $t_4$ counter by ignoring a specified number of the least significant binary digits of the summed count. For example, if 16 counts of $t_4$ are accumulated in counter 113, by ignoring the four least significant, or righthandmost outputs of counter 113, the remaining output terminals provide a count which is the average of the 16 counts accumulated therein. Thus, the system 100, at any remote location, has the capability of generating one $t_1$ count, plus the average of 16 $t_4$ counts.

Accordingly, at the conclusion of the above described procedures, the transmitting programmer 114 is presented with a $t_1$ measurement via outputs 112a and with the average of the $m$ determinations of $t_4$ via the outputs 113a.

When a selective telemeter request code is received at the link 101, this is passed by the tone receiver equipment 102 and impressed upon the receiving programming logic 103. The logic circuitry 103, upon proper interpretation of the selective telemeter request code, applies a telemeter request signal via its output 103d to one input of the transmitting programmer 114. The transmitting programmer 114 first schedules $n$ repeat transmissions of the 60 cycle clock pulses appearing at output 110b of the remote stage clock 110. These are applied through the output 114a to tone transmitter circuitry 115 and subsequently to the link 116. Immediately following the $n$ repeat transmissions of the 60 cycle clock pulses, the transmitting programmer applies the $t_1$ measurement word via its output leads 114b to the data transmitter 117. The data transmitter 117 which receives the $t_1$ word in parallel fashion, steps the $t_1$ word out in a serial manner by means of its output terminal and impresses it upon the tone transmitter circuitry 115 which passes the $t_1$ measurement word to the link 116.

Upon completion of transmission of the $t_1$ word, if no request for a "word-repeat" is received by means of the output 103e from receiving program logic 103, then the data transmitter 117 transmits an "end-of-word" signal to the transmitting programmer 114 via lead 117b. As a result, the programmer 114 is advanced to its next program step by which it then applies the $t_4$ "measurement word" via its output terminals 114b and impresses this upon the transmitter 117. Again, on completion of transmission of this "word," if no repeat requests are received, the transmitting programmer 114 is signalled via the output 117b of data transmitter 117 for the purpose of advancing the programmer means 114 to its next program step. Any number of additional digital or analog data "words" may then be appended to the phase angle measurements data, depending only upon the needs of the user. Such words are applied via the input terminals 114c to be impressed upon the programming means 114 and subjected to the described interlocking arrangement between the programming means 114 and data transmitter 117.

At the conclusion of the entire telemeter program at the remote location, reset signals are generated by the transmitting programmer and appear at its output terminals 114d and 114e for the purpose of resetting the $t_1$ and $t_4$ counters 112 and 113 respectively, so as to prepare the counters 112 and 113 for the next duty cycle.

In the instances of "repeat word" requests, generated at the central dispatch office, these words are processed via the link 101 and tone receiver 102 and are impressed upon the receiving program logic 103. Upon receipt of such a "repeat word" request, the signal is generated at its output lead 103e, to be impressed upon data transmitter 117. This signal causes data transmitter 117 to repeat transmission of the word being transmitted via data transmitter 117 and further causes the transmitter to withhold its "end-of-word" signal via its output lead 117b. It should be understood that the measurement command request and the selective telemeter request need not be generated one after the other, but the selective telemeter request may be generated at any appropriate time after generation of the measurement command signal.

*Central dispatch office hardware*

The central dispatch office hardware 200 is shown in FIGURE 6 of the drawings and is comprised of a 60 cycle reference sine wave source 201 which is appropriately squared in the squaring circuit 202 of FIGURE 5. It should be understood that the 60 cycle reference sine wave sources 105 and 201 of FIGURES 5 and 6 respectively, represent replicas of the 60 cycle voltage sine wave produced by the generating stations at the remote and central dispatch office locations.

The 60 cycle square wave pulse train appears at the output of circuit 202 and is impressed upon the $t_2$ gate circuit 203, for the purpose of obtaining $t_2$ measurements. The gate circuit 203 is preferably any suitable gate circuit which is open upon the simultaneous presence of a plurality of input signals, which are to be more fully described.

The central dispatch office (cdo) clock 210 is substantially identical to the clock circuitry 10, shown in FIGURE 2a of the drawings, and generates a 60 cycle signal at its output terminal 210a and a 240 kc. signal at its output terminal 210b. Upon simultaneous receipt of the 60 cycle output at 210a and the 240 kc. signal at output 210b, the $t_2$ gate circuit 203 passes the 240 kc. signal at its output and impresses it upon the $t_2$ counter 204. Counter 204 is preferably any suitable multistage counter means having a sufficient number of stages for generating a suitable $t_2$ count. Upon receipt of the next positive going portion of the 60 cycle square pulse train from circuit 202, the $t_2$ gate 203 closes, thus terminating the operation of $t_2$ counter 204; $m$ successive gating operations are performed by gate 203 for the purpose of accumulating $m$ $t_2$ counts in counter 204.

Upon completion of the $m$th gating operation, the gating device 203 generates a signal at its output 203b, which is a notice to the data word transfer logic 205 to accept the counter appearing at outputs 204a as the average value of $m$ successive $t_2$ measurements. The average is obtained by ignoring the four least significant digit positions of the counter output (in the case of 16 $t_2$ counts).

The central dispatch office hardware 200 is further comprised of a repeat cycle timer 206, for the purpose of initiating the phase angle measurement and telemetering sweeps of the remote locations, which operations are initiated on a periodic basis. The repeat cycle timer 206 may be any suitable electronic or electromechanical timing means for initiating such requests at the end of every hour, for example. Such requests may be spaced at any other suitable intervals, depending only upon the needs of the user. When the next phase angle measurement and telemetering sweep operations are to be initiated, the repeat cycle timer 206 generates an output signal which is impressed upon the measurement command logic 207. The measurement command logic 207 is comprised of suitable logic circuits employed for the purpose of initiating the appropriate hardware at the central dispatch office for the sequential performance thereof. The measurement command logic 207, upon receipt of a signal from the repeat cycle timer 206, signals the transmitters control logic 208 to simultaneously request measurements to be taken at all remote stations. Simultaneously therewith, the same signal is impressed upon the input of the $t_2$ gate 203 for initiating the $t_2$ measurement. The output signal from measurement command logic 207 is further simultaneously impressed upon the selective telemeter logic 209, which generates at its output terminals 209a, the appropriate identifying address code for the $t_2$ average measurement in order that the $t_2$ measurement will be stored in the appropriate location of the computer 212 employed to process the phase angle data. The selective telemeter logic 209 is comprised of circuitry adapted to generate the address code representative of the address or location at which the $t_2$ measurement is to be stored in the computer memory. The address appears at the output terminals 209a and is impressed upon the address logic circuitry 211, which develops the associated address for impression upon the computer 212. The address is developed in accordance with an instruction by the telemeter logic, which is impressed upon the address logic 211. Thus, when the $t_2$ write signal appears at the output 203b of gate 203, the $t_2$ measurement address is available at the output of address logic 211 simultaneously with the availability of the $t_2$ measurement at the output 205a of data word transfer logic 205 which receives the $t_2$ measurement from the counter 204 at its output terminals 204a. Thus, upon initiation of the measurement command signal the central dispatch office hardware 200 generates the average $t_2$ measurement and simultaneously therewith generates the address at which the $t_2$ measurement is to be located in computer memory and passes both the address and the data portion to the computer 212.

The measurement command logic 207 impresses the measurement command signal upon the transmitters control logic 208 which passes the measurement command signal to the tone transmitter circuitry 213 which impresses the measurement command upon the link 214. The measurement command is simultaneously impressed upon all remote location hardware for the purpose of simultaneously initiating the $t_1$ and $t_4$ measurement operations at each remote point.

When the $t_2$ gate 203 signals completion of the $t_2$ measurement operation at its output terminal 203b, this signal is impressed upon one input of the selective telemeter logic 209 causing it to apply the selective telemeter address code of the first remote station via its output terminals 209b upon the transmitters control logic 208. This address code, generated by selective telemeter logic 209 and passed by the transmitters control logic 208, is impressed upon the tone transmitter circuitry 213 for the purpose of contacting the first remote station, which is identified by such code. This causes the first remote station to be "read," which remote station then replies by transmitting $n$ successive iterations of its 60 cycle clock pulses, in the same manner as previously described. These clock pulses tre received by the incoming link 215 and impressed upon the tone receiver circuitry 216. The tone receiver circuitry 216 impresses the $n$ successive iterations of the 60 cycle clock pulses and via its output lead 216a impresses the clock pulses upon the selective telemeter logic circuitry 209. The selective telemeter logic circuitry 209, in turn, treats the receipt of the 60 cycle clock pulses as notice of compliance of the remote station with the telemeter request. The iterative clock pulses received are simultaneously impressed by lead 216a upon the $t_5$ gate 217, so as to open gate circuit 217 to pass the 240 kc. signal impressed upon gate 217 by lead 210a. These clock pulses are passed by the $t_5$ gate output 217a, impressed upon the counter 204, which now acts as the counting means for generating the $t_5$ measurements. Each $t_5$ measurement is terminated upon receipt of the 60 cycle clock pulse signal positive going portion, which is impressed upon gate 217 by the output lead 210b of clock 210. After $n$ iterations of this process, the $t_5$ gate device 217 generates a write signal at its output 217b which is impressed upon one input of the selective telemeter logic 209, for the purpose of generating a $t_5$ address instruction at its output terminals 209a so that both the $t_5$ data word and the computer address for which it is destined to be located, become available at the outputs 211a and 205a, respectively. The output signal generated at lead 217b is also impressed upon the data receiver 218, which also receives a signal from the output lead 209c of selective telemeter logic 209, directing the data receiver 218 to respond to the balance of the remote stations telemeter message.

The data receiver 218 is thus made ready to receive the remote stations $t_1$ "word." The "word" arrives through the link 215 and is impressed upon the tone receiver 216, which in turn impresses the incoming data word upon the data receiver 218. Upon the completion of receiving the word a write signal is produced at the output terminal 218a, which accompanies the data word appearing at the output leads 218b. The write signal and the receive data word are simultaneously impressed upon the data word transfer logic 205. The write signal is further impressed upon the selective telemeter logic 209 for the purpose of generating at its output terminals 209a the appropriate address of which the receive data word is to be stored. This is passed through the address logic 211 at its output terminals 211a to the computer 212. Simultaneously therewith the received word which is passed to transfer logic 205 via the output leads 219b of data receiver 218 and is further passed through logic 205 to the computer 212 so that the address and the data are simultaneously impressed upon the computer for storage at the suitable memory location. The "word" transfer to the data word transfer logic 205 resets the data receiver 218 via the output 205b of logic 205 so as to place data receiver 218 in readiness for receipt of the $t_4$ word. Again, upon arrival of the $t_4$ word, both the telemeter logic 209 and the data word transfer logic 205 are notified by a write signal at the output 218a and again a corresponding computer address appears at 211a in conjunction with the data word appearing at 205a for transfer of the "word" to the computer 212.

At the conclusion of the second write signal at lead 218a, selective telemeter logic 209 is stepped to its next remote station address code position and the selective requesting of the next telemeter report occurs. It should be understood that if wattmeter and varmeter readings are to be transmitted, this data will be transmitted prior to the stepping of the selective telemeter logic stepping to the next remote station address. Upon any erroring of the $t_1$ or $t_4$ word, the data receiver 218 requests a repeat of transmission via its output 218c, which causes the transmitters control logic 208 to operate tone transmitters 213 to generate the repeat request code.

Through such a station-to-station stepping of the telemeter logic throughout its entire selective request program, each remote station is interrogated in turn and in each case an identical sequence of reporting actions occurs.

FIGURES 7–12 show the significant portions of the remote station hardware of FIGURE 5 in greater detail. The operation of the detailed hardware is as follows:

The measurement command previously described, after having been processed by the measurement command logic 207, processes a signal from the circuit 207 shown in FIGURE 6 to generate a signal impressed upon the gate 111A shown in FIGURE 5 which receives this signal through the receiving program logic 103 of FIGURE 5. This signal causes the output terminal 300a of flip-flop 300 to go to the binary one state (see FIGURE 9). This signal, together with the 240 kc. clock pulse is impressed upon an AND gate 301, which is opened when output 300a goes to the binary one state to pass the 240 kc. clock pulses to the input terminal 303 of a multistage counter 302, each stage of which is comprised of a flip-flop 304. The flip-flops 304 are connected in such a manner as to form an accumulative adder or counter means, the count of which is increased by one upon the receipt of each 240 kc. clock pulse passed by AND gate 301 of FIGURE 9 to the input terminal 303 of the counter 302. The output terminals 305a–305m of counter 302 are connected to the associated inputs of AND gates 306a–306m, respectively, also shown in FIGURE 9. The second inputs of each AND gate 306a–306m are connected to common bus means 314 to pass the accumulated count generated in counter 302 for the purpose of transmission thereof, in a manner to be more fully described. The counter means 302 and AND gates 306a–306m constitute the $t_1$ counter means 112.

The 240 kc. clock pulse is derived from the clock source 110 shown in FIGURE 7. Clock source 110 is comprised of an oven controlled crystal oscillator 307 which feeds its output signal to a Schmitt trigger circuit 308 so as to generate a very sharp square pulse train at its output terminal 308a. The 240 kc. pulses in addition to being available for generating a count in the $t_1$ and $t_4$ counters, is also impressed upon input terminal 309 of the count-of-4K counter 310. Counter 310 is comprised of a plurality of flip-flop stages 311, connected in the manner as shown in FIGURE 7, and having selected ones of its output terminals 312 connected to the input terminals of AND gate 313. The selected outputs impressed upon the input terminals of AND gate 313 are chosen so that the AND gate 313 generates a pulse at its output terminal 313a after 4,000 240 kc. pulses are impressed upon the counter 310. Thus the output of the count-of-4K counter, which passes through an emitter follower 315, is available at output terminal 316 and has a pulse rate of 60 pulses per second as a result of the 240 kc. signal being divided by 4,000 by means of the counter 310 and AND gate 313.

Returning to FIGURE 9, the 240 kc. pulses from output terminal 308a are impressed upon the AND gate 301 and passed through gate 301 to the input terminal 303 of the multistage counter 302. The receipt of each pulse from the 240 kc. pulse output causes the $t_1$ counter 112 to increase its count by one upon each receipt thereof. The counting operation is terminated upon receipt of the next 60 cycle pulse available at output terminal 316, which is impressed upon the reset input terminal of flip-flop 300, shown in FIGURE 9, so as to close the AND gate 301. Thus $t_1$ counter 112, at the end of the $t_1$ counting operation, contains a count representative of the phase delay between the measurement command received from the central dispatch office and the first 60 cycle clock pulse occurring after receipt of the measurement command.

The 60 cycle clock pulse which is impressed upon the reset input terminal of flip-flop 300, in addition to causing the output terminal 300a to go to binary zero, sets the output terminal 300b in the binary one state indicative of the fact that the $t_1$ measurement operation has been completed. This binary one condition is impressed upon the input terminal 317 of a three-stage counter 318 which forms a part of the receiving program logic 103, shown in FIGURE 8. The three-stage counter 318 is comprised of three flip-flops 319, connected in the manner shown. The binary one output from terminal 300b of flip-flop 300, shown in FIGURE 9, which is impressed upon the input terminal 317, causes the flip-flop stages 319 to be reset with the output terminals $\overline{321a}$–$\overline{321c}$ going to the binary one state. These three output terminals are connected to the three input terminals of AND gate 322, which generates a binary one condition at this time.

Returning to the $t_1$ gate, 111A, shown in FIGURE 9, the measurement command request, which is impressed upon the set input terminal of flip-flop 300, is further impressed upon the trigger input terminal of the one-shot multivibrator 323, the output of which goes binary one and passes through emitter follower 324 to output terminal 325 which impresses this binary one condition upon the reset input terminal 326 of the $t_1$ counter 302 to reset $t_1$ counter means immediately prior to the initiation of the $t_1$ measurement operation.

Returning to the programmer means 103, of FIGURE 8, the resetting of three-stage counter 318, which causes the AND gate 322 to generate a binary one condition at its output terminal, permits the initiation of the $t_4$ measurement operation. The output of AND gate 322, which is 322a, is impressed upon one input terminal of AND gate 327 which forms the $t_4$ gate circuit 111B, shown in FIGURE 10. This enables the AND gate 327. The $t_4$ gate circuit 111B is further comprised of a bistable flip-flop 328 having its set input terminal connected to the 60 cycle clock output of the clock source 10, shown in FIGURE 7. Upon receipt of the next 60 cycle clock pulse the output terminal 328a of flip-flop 328 goes to binary one and with the termnials 328a and 322a in the binary one condition this passes 240 kc. clock pulses impressed from output terminal 308a of the clock pulse source 110, upon the third input terminal of AND gate 327. This opens AND gate 327, which impresses the 240 kc. clock pulses upon the input terminal 329 of a multi-stage counter 330. The stages of counter 330 are comprised of flip-flops 331 and are connected in the manner shown in FIGURE 10. There are suitable number of stages sufficient to accumulate the number of iterative $t_4$ measurements.

The first $t_4$ measurement is terminated by means of the generating station sine wave 105, shown in FIGURE 10, which is identical to the clock 105, shown in FIGURE 5. The generating station sine wave is squared by means of the Schmitt trigger 106, which is equivalent to the squaring circuit 106 shown in FIGURE 5. Upon the occurrence of the next positive going portion of the square wave, the output of the squaring circuit 106, being connected to the reset input terminal of flip-flop 328, causes the output terminal 328a to go to binary zero, closing AND gate 327, and further, causes the output terminal 328b of flip-flop 328 to go to the binary one state. This terminates the first $t_4$ count.

The output terminal 328b is connected to the input terminal of AND gate 329, forming part of the programmer means 103, shown in FIGURE 8. The other input terminal of AND gate 329 is connected to the output of AND gate 322, shown in FIGURE 8, which is indicative of a zero count being contained in the three-stage counter 318, also shown in FIGURE 8. The binary one condition of AND gate 329 is passed through OR gate 330 at its output terminal 330a to the input terminal 331 of a multi-stage counter 332. Counter 332 is provided with flip-flop stages 333, is connected in the manner shown in FIGURE 8, and has its output terminal 334 connected to the input of AND gate 336. The output terminal 334 of multi-stage counter 332 goes to binary one when 16 counts have been accumulated in the counter 332. The other input of AND gate 336 is connected to the output of OR gate 335, which has its input terminals connected to the outputs of AND gates 322 and 337 shown in FIGURE 8. The AND gate 336 serves to generate an output each time 16 counts are accumulated in the counter 332 for the purpose of advancing the counter 318 by a count of one to indicate a completion of 16 such iterative $t_4$ measurements.

The $t_4$ gate 11B having been reset by the squaring circuit 106, as shown in FIGURE 10, is set again by the next 60 cycle clock pulse received at its set input terminal, which is the input terminal of flip-flop 328, to again enable AND gate 327 to pass the 240 kc. clock pulses to the input of the multi-stage counter 330, as shown in FIGURE 10. The count is again terminated upon receipt of the next positive going portion from the squaring circuit 106 which terminates the second $t_4$ measurement operation and again causes the output terminal 328b of flip-flop 328 to go to the binary one state. This condition is again impressed upon the AND gate 329, shown in FIGURE 8, which in turn passes this signal through OR gate 330 to increase the count in the multi-stage counter 332 to a count of $tw$. Iterative $t_4$ measurements continue in this manner until 16 such measurements are accumulated in counter 330 of FIGURE 10, at which time after the last reset pulse is received to terminate the 16th $t_4$ measurement count, the multi-stage counter 332 of FIGURE 8 generates an output pulse at its terminal 334 which is impressed upon one input of AND gate 336. This binary one state is passed by AND gate 336 and OR gate 338 to one input terminal of OR gate 339, shown in FIGURE 8, the output of which is impressed upon the input terminal 320 of the three-stage counter 318. This causes counter 318 to increase its count by one. When this occurs, the appropriate output terminals of counter 318, being binary one, cause the AND gate 337 to pass a binary one condition and further causing the AND gate 322 of FIGURE 8 to close, thereby closing the gate 327 of FIGURE 10, to prevent any additional $t_4$ counts from being collected. At this stage, the remote location has completed both its $t_1$ and iterated $t_4$ measurement operations.

The $t_4$ counter 113 of FIGURE 10 is further comprised of AND gates 335f–335q, also shown in FIGURE 10, each AND gate having one of its input terminals connected to the output terminals 336f–336q of the multi-stage counter 330, shown in FIGURE 10. A second input terminal of each of these AND gates 335f–335q is connected to a common bus 337 which enables the AND gates at the time that the $t_4$ count is to be transmitted from the remote location to the central dispatch office. The third input terminal of each AND gate 335f–335q is connected to the near zero tag circuitry 400, shown in FIGURE 11 of the drawings, which operates in a manner to be more fully described. It should be noted that the output terminals 336b–336e of counter 330, shown in FIGURE 10, are not utilized and hence are not connected to the AND gates 335f–335q. The reason for this is that these four outputs 336b–336e are the least significant digit positions of counter 330 and by casting these four least significant digit positions away and accepting the output of the remaining positions this gives an averaged $t_4$ count of the 16 counts accumulated therein.

The near zero tag circuitry 400, shown in FIGURE 11, is provided for the purpose of generating an indication of the fact that the phase delay between the generating station sine wave 105 and the 60 cycle clock at the remote station is such a small phase delay as to be well within the 0.5° error tolerance provided by the circuit. Thus, whenever a phase delay of smaller than 0.5° exists between the 60 cycle clock output and the generating station sine wave, an indication is thereby generated to show that for all practical purposes these two 60 cycle signals are in phase synchronism. A second and very important function of the near zero tag circuit is to block the averaging operation when there exists the danger that the arithmetic average will not give a proper indication of the phase angle. This can occur in the following manner. If a first phase angle measurement is 359.5° and the second phase angle measurement is 0.5°, in both cases the phase angle is within ½° of a 0° or phase synchronized condition and it should be properly designated as a 0° phase angle. However, the average of a 359.5° and 0.5° measurement is 180°, which is definitely an improper indication of the phase angle measurement. The near zero tag circuit prevents such a false average from being generated in the manner described below. The operation of the near zero circuit 400 is as follows:

The near zero circuit is provided with an AND gate 401 having four input terminals which are connected to the output terminals 336b NOT, 336c, 336d and 336e, respectively. When these output terminals are in the binary one state, the AND gate 401 will pass a binary one condition to the set input terminal of a flip-flop 402. Thus, as the $t_4$ counter of FIGURE 10 is generating the first $t_4$ count, as soon as this count reaches the count of 13 AND gate 401 goes to the binary one state to set flip-flop 402, causing its output terminal 402a to go to the binary zero state. However, if the count-of-13 is neither exceeded nor reached, AND gate 401 remains closed so as not to set flip-flop 402, causing its output terminal 402a to remain in the binary one state. Flip-flop 402 is reset at its input terminal 402b upon receipt of the 60 cycle clock pulse from the output terminal 316, shown in FIGURE 7. Assuming that the count-of-13 has neither been exceeded nor reached, and as soon as the first $t_4$ measurement operation is completed, the flip-flop output terminal 328b of FIGURE 10 goes to binary one. This condition is impressed upon one input terminal of AND gate 403 of FIGURE 11. The other input terminal is connected to 402a of flip-flop 402. Thus, if the count of 13 has not been exceeded nor reached, AND gate 403 generates a binary one condition indicative of the fact that a $t_4$ counter contains a count of 13 or less. This binary one state is impressed upon the set input terminal of a flip-flop 404 causing its output terminal 405 to go to binary one. This binary one state is impressed upon one input terminal of an OR gate 406 causing its output terminal 406a to go to binary one. This condition is impressed upon an inverter circuit 407 such that its output will be binary zero when the output of OR gate 406 is binary one. The output 407a of inverter 407 is impressed upon the common bus 338, shown in FIGURE 10 of the drawings, which impresses this binary zero condition upon one input terminal of each of the AND gates 335f–335q of FIGURE 10. This thus disables all of the AND gates 335f–335q, preventing a $t_4$ count [or, in other words, passing a zero $t_4$ count] from being generated due to the effective synchronism between the generating station sine wave and the local 60 cycle clock pulse. This condition is transmitted to the central dispatch office in a manner to be more fully described. Thus, a count of 13 or less causes a near zero condition to be indicated. In addition to the above, a count of very close to 4,000 or a count of 3,087, or greater, also warrants a near zero tag. This indication is generated by means of the AND gates 408–411, shown in FIGURE 11. The input terminals of AND gates 408–410 are connected to the appropriate output terminals of $t_4$ counter 330, shown in FIGURE 10, so that as soon as a count of 3,087 is contained therein AND gates 408–410 go to binary one and all these binary conditions are impressed simultaneously upon AND gate 411, which also, in turn, goes to binary one, enabling the AND gate 412. The remaining input of AND gate 412 is connected to the output terminal 413a of flip-flop 413, which terminal is binary one upon receipt of the reset condition of three-stage counter 318, shown in FIGURE 8, causing the AND gate 322 to generate a binary one condition, the output terminal 322a of which is connected to the set input terminal of flip-flop 413, shown in FIGURE 11. As soon as a count of 308 is generated AND gate 412 goes to binary one, impressing its output 412a upon the set input terminal of flip-flop 414, shown in FIGURE 11, the output terminal 414a of which is connected to one input of OR gate 406, causing this binary one condition to be impressed upon the inverter circuit 407 which generates a binary zero condition at its output terminal 407a. Thus, as soon as a count of 3,087 is achieved, output terminal 407a of the inverter 407 goes to binary zero so as to disable all of the AND gates 335f–335q, shown in FIGURE 10, causing a $t_4$ count of zero to be transmitted to the central dispatch office from the remote location. If any count greater than 13, or less than 3,087 is generated, the output of inverter circuit 407 remains in the binary one condition causing whatever $t_4$ count is accumulated in the counter 113, shown in FIGURE 10, to be transmitted from the remote location to the central dispatch office. Thus, upon receipt of a measurement command, each remote location generates a $t_1$ count and either an averaged $t_4$ count or a near zero indication of the $t_4$ count.

After these measurements have been taken the remote location awaits the receipt of the selective telemeter request from the central dispatch office, which signal requests each remote location, in turn, to transmit the measurements taken at that remote location. The selective telemeter request is impressed upon the programmer circuit 103, shown in FIGURE 8, at the input terminal of a flip-flop 340. This causes its output terminal 340a to go to the binary one state, enabling the AND gate 341.

The second input terminal of AND gate 341 is connected to the output terminal 337a of AND gate 337, shown in FIGURE 8, which is in binary one to indicate that the three-stage counter 318 of FIGURE 8 contains a count of one. This count of one indicates that all of the measurements to be taken at that remote location have been taken. The third input terminal is connected to the 60 cycle clock pulse source of output terminal 316. Thus, when the selective telemeter request has been received, and when the count of 318 is in the count of one condition, the 60 cycle clock pulses are passed by AND gate 341 to the transmitter circuit 117, shown in FIGURE 5, for transmission of 16 such clock pulses. The output of AND gate 341 is further impressed upon OR gate 330, the output terminal 330a of which is impressed upon the counter 332 of FIGURE 8, which increases its count by one, each time a 60 cycle clock pulse is passed to the transmitter 117, shown in FIGURE 5. As soon as 16 such clock pulses have been transmitted, the output terminal 334 of counter 332 goes to binary one and this condition is impressed upon the reset input terminal of flip-flop 340, causing the flip-flop 340 to be reset, which, in turn, disables the AND gate 341. This occurs as soon as 16, 60 cycle clock pulses have been transmitted to the central dispatch office. When the count of 16 is reached in counter 332, this, coupled with a count of one state being contained in the three-stage counter 318, shown in FIGURE 8, causes the AND gate 336 of FIGURE 8 to go to binary one which, in turn, causes the counter 318 to increase its count so as to now contain a count-of-two. The output of AND gate 336 is also passed through OR gate 338 to reset the counter 332. When a count-of-two is contained in counter 318, this condition is recognized by AND gate 343 of FIGURE 8, which is an indication that the 16, 60 cycle clock pulses have been transmitted to the central dispatch office and that the next step of the program may be performed. The output of AND gate 343 appearing at 343a is impressed upon the trigger input terminal of the one-shot multivibrator 344, shown in FIGURE 8, which causes its output terminal 344a to go to the binary one state, impressing this condition upon the bus 314, shown in FIGURE 9 of the drawings, enabling all of the AND gates 306a–306m to pass the count accumulated in the $t_1$ counter 112 to the transmitter 117, shown in FIGURE 5.

Upon successful receipt of the $t_1$ measurement at the central dispatch office, no repeat request signal is transmitted to the remote location. Failure to receive a repeat request causes a signal to be generated (by means not shown). This signal is received at one input terminal of the OR gate 339, shown in FIGURE 8. This condition causes the counter 318 of FIGURE 8 to advance by one more count thus containing a count-of-three therein. This causes the AND gate 345 of FIGURE 8 to go to binary one condition at its output terminal 345a, which binary one state is impressed upon the trigger input terminal of a one-shot multivibrator 346. The output 346a thereof is impressed upon bus 337, shown in FIGURE 10, to enable all of the AND gates 335f–335q to pass the $t_4$ count contained in counter 330 shown therein. This $t_4$ measurement (or near zerotag, as the case may be) is then relayed to the central dispatch office which will again acknowledge receipt upon successful receipt of the $t_4$ measurement, causing the counter 318 of FIGURE 8 to step to a count of four condition. This, in turn, enables the AND gate 347, shown in FIGURE 8, causing the output 348a of flip-flop 348 in FIGURE 8 to go to the binary one state if an additional data word is to be transmitted to the central dispatch office, which data word is in addition to the $t_1$ and $t_4$ measurements which it is desired that the remote location transmit. It should be understood that either no, or any reasonable number of data words may be transmitted from each remote location, depending upon the needs of the user and if it is desired that more data words than one be transmitted, the counter 318 may be designed to have increased capacity to handle as many additional data words as are desired.

FIGURE 12 shows the gates 450 employed for the purpose of loading the measurements taken at the remote point into the remote point transmitter means. They consist of the OR gates 451a–451m, the outputs of which are impressed upon the transmitter means 117 shown in FIGURE 5. A first input of each OR gate 451a–451m is connected to the outputs of gates 306a–306m, shown in FIGURE 9, which gates transfer the count of the $t_1$ counter 302, shown in FIGURE 9, through to the OR gates 451 of FIGURE 12. The second input of each OR gate 451 is connected to the outputs of gates 335f–335q, shown in FIGURE 10. The gates 335 transfer the $t_4$ averaged count contained in counter 330 of FIGURE 10 to the OR gates 451. The remaining input of each OR gate 451 is connected to the output of AND gates 452a–452m, respectively, as shown in FIGURE 12. Each of these AND gates have a first input terminal for receiving other data words, such as, for example, wattmeter and varmeter readings to be transmitted to the central dispatch office, in addition to the other information from the central dispatch office. The second input terminal of each AND gate 452 is connected to a common bus 453, which bus is connected to the output 348a of flip-flop 348, shown in FIGURE 8. This output of the flip-flop goes to binary one upon the fifth count of the counter 318, shown in FIGURE 8, which count is reached to indicate completed transmission of the $t_1$ measurement, the $t_4$ measurement and the 16 clock pulses which are transmitted to the central dispatch office. The measurements transmitted from the remote point are appropriately converted to predetermined tones for receipt by the central dispatch office. While a tone transmission mode has been employed herein, it should be understood that any other suitable type of transmission mode may be employed, depending only upon the needs of the user.

*Central dispatch office hardware (detailed)*

The detailed hardware of the central dispatch office is shown in FIGURE 13 through FIGURE 22. The operation of the detailed hardware at the central dispatch office is as follows:

The selective telemeter logic 209 of FIGURE 6 for the central dispatch office is also shown in FIGURE 13 and is comprised of first, second and third counters 500–502 respectively. Counter 500 is comprised of flip-flop stages 503 and is connected, in the manner shown in FIGURE 13, for the purpose of generating a count of at least 25. This count is used to represent the number of remote stations in the system, which in the present example will be considered to be 25 remote stations, plus a central dispatch office. It should be understood, however, that a greater or lesser number of remote locations may be provided in the system with the counter 500 being modified in accordance with the desired number of remote stations. The identification of the appropriate remote station is determined by means of the gates 507a–507b', shown in FIGURE 15, which make up the address logic 211 of FIGURE 6. Each gate of the group of 25 gates is connected to selected ones of the output terminals 508a–508e and $\overline{508a}$–$\overline{508e}$ of the counter 500. For example, when the counter 500 contains a count of zero, i.e. it has just been reset, AND gate 507 will be open. If, for example, the counter 500 contains a count of ten, gate 507L will be open, and so forth.

The counter 501, shown in FIGURE 13, is comprised of flip-flop stages 503, connected in the manner shown, as is provided for the purpose of identifying the particular measurement being received from the remote point which is transmitting at that particular time. The outputs 509a–509c and $\overline{509a}$–$\overline{509c}$ of counter 501 are selectively connected to inputs of the AND gates 510a–510f, shown in FIGURE 16, which also form part of the address logic 211, shown in FIGURE 6 of the drawings. It will be recalled that each remote location first transmits 16 clock pulses from its own station clock, then transmits a $t_1$ and $t_4$ measurement and further may transmit other measurements such as a wattmeter reading and a varmeter reading. When the counter 501 of FIGURE 13 has been reset, or is at a count of zero, the AND gate 510a will be opened. At a count of one, AND gate 510b will be opened, signifying the receipt from the remote point of the 16 clock pulses from the remote point clock source. At a count of two, AND gate 510c will be opened to signify receipt of the $t_1$ measurement, and so forth.

The counter 502, shown in FIGURE 13, is comprised of flip-flop stages 503, connected in the manner shown, and is capable of developing a count of at least 16. Its output terminals 511a–511e and $\overline{511a}$–$\overline{511e}$ are selectively connected to inputs of the AND gates 512a–512r, shown in FIGURE 16, which comprise a portion of the address logic 211, shown in FIGURE 6. Counter 502, together with the AND gates 512, identify the particular clock pulses being received from the remote location, which clock pulses are employed for the purpose of generating the $t_5$ measurement at the central dispatch office.

Before considering the actual operation of the central dispatch office hardware, a brief description of the operational format will first be considered. When the central dispatch office desires phase angle information, it initiates operation by transmitting a measurement command to all of the remote points in the network. This measurement command causes each of the remote points to simultaneously generate the $t_1$ and $t_4$ measurements at those points. Simultaneous with this operation, the measurement command causes the central dispatch office to generate the $t_2$ measurement, which is the measurement of the phase delay existing between the reference sine wave at the central dispatch office and the 60 cycle clock at the central dispatch office. Upon completion of the $t_2$ measurement at the central dispatch office, the next step is that of contacting each remote point in sequence to collect the data gathered at these remote points. Starting with the first remote point, the central dispatch office transmits a selective telemeter request, causing the remote point to first transmit 16 clock pulses from the remote point clock source. These 16 clock pulses are received at the central dispatch office in the central dispatch office $t_2$ counter to generate 16 $t_2$ counts. Each one of the 16 $t_2$ counts so generated is identified first by a signal to indicate from which remote point it is being received and secondly, by a signal to indicate which of the 16 clock pulses is being received at that given instant of time. Thus, each $t_2$ measurement is tagged to identify the number of the measurement and the remote point from which it is being received. These two tagged bits are employed for the purpose of addressing the $t_2$ measurement to the appropriate position in the computer memory. It should be understod that immediately before receipt of the clock pulses from the remote point being called, the $t_2$ measurement generated at the central dispatch office is also addressed to memory.

After having received the 16 clock pulses and having stored the $t_5$ measurements in memory, the central dispatch office then receives the $t_1$ and $t_4$ measurements from the remote point being called, as well as wattmeter and varmeter readings. Each of these measurements and/or readings are tagged by a first signal to indicate which measurement they represent as well as a second signal which indicates the remote point from which it has been received. These two tags are employed to address the words to the appropriate locations in memory. This completes all the information which is to be revived from the first remote point. The central dispatch office then repeats the entire operation for each subsequent remote point called. In the case where 25 remote points are employed, at the termination of receipt of information from the 25th remote point, the entire operation is repeated.

As soon as all of the measurements have been addressed to memory, the computer may begin its computational functions after gathering all information from the network in the first sweep at the same time that it may be receiving information from the network during the second sweep of all remote points.

Considering now the detailed hardware of FIGURES 13–22, the completion of the receipt of information from the 25th remote point causes the AND gate 507a', shown in FIGURE 15, to open. This open gate condition is impressed upon gate 513, shown in FIGURE 14. AND gate 513 has a second input terminal which receives a second input pulse from an AND gate 514, which operates in a manner to be more fully described, so as to open gate 513, causing the flip-flop 515 to set its output terminal 515a to the binary one state. This enables the AND gate 516. Upon receipt of the next positive going portion of the 60 cycle clock pulse at the central dispatch office, gate 516 is opened to generate a measurement command. The 60 cycle clock pulse is generated by a clock which is identical to the clock 110, shown in FIGURE 7, and a second detailed description of the central dispatch office clock will be omitted, reference being made to the clock 110 of FIGURE 7 for this purpose. This 60 cycle clock pulse is derived from the output terminal 316, shown in FIGURE 7. Thus the AND gate 516 of FIGURE 14 is opened to generate a measurement command pulse. This measurement command pulse is forwarded to the transmitter 208 at the central dispatch office, shown in FIGURE 6, and is simultaneously sent to all remote locations to command the remote locations to make the appropriate measurements.

In addition thereto, the measurement command is impressed upon the reset input bus 517 of counter 500, shown in FIGURE 13, to reset this counter to zero. The measurement command is also impressed upon one input terminal of OR gate 518, shown in FIGURE 13, which is passed to the reset input bus 519 of counter 502, establishing the count of zero in counter 502 as well.

Counter 500, obtaining a count-of-zero, causes the count-of-zero AND gate 507a, shown in FIGURE 15, to be opened. This opened gate condition is impressed upon the AND gate 520 of FIGURE 18, which shows the counter 204, also shown in FIGURE 6. The AND gate 520 also receives the 60 cycle clock pulse output at its second input terminal and opens at this time to set the output terminal 521a of flip-flop 521 to binary one. This binary one state is impressed upon one input of AND gate 522, the other input of which receives the 240 kc. clock pulse derived from the output terminal 308a of the clock 110, shown in FIGURE 7. Thus AND gate 522 passes the 240 kc. pulses to the input terminal 523 of the multi-stage counter 524. The multi-stage counter 524 is comprised of flip-flop stages 503, connected in the manner shown and having a sufficient number of stages to generate a count of as great as 4,000.

Upon the occurrence of the next positive going portion of the squared reference sine wave at the central dispatch office, the count in the counter 524 is terminated. This count is derived from the reference sine wave source 201, shown in FIGURE 18, and also shown in FIGURE 6, the output of which is squared by the squaring circuit 202 and impressed upon the reset input terminal of flip-flop 521. When this positive going portion of the squared reference sine wave occurs, flip-flop 521 has its output terminal 521a go to binary zero and its output terminal 521b go to binary one. This causes AND gate 522 to close, blocking further 240 kc. pulses from increasing the count in counter 524, thus terminating the $t_2$ count.

Figure 18:
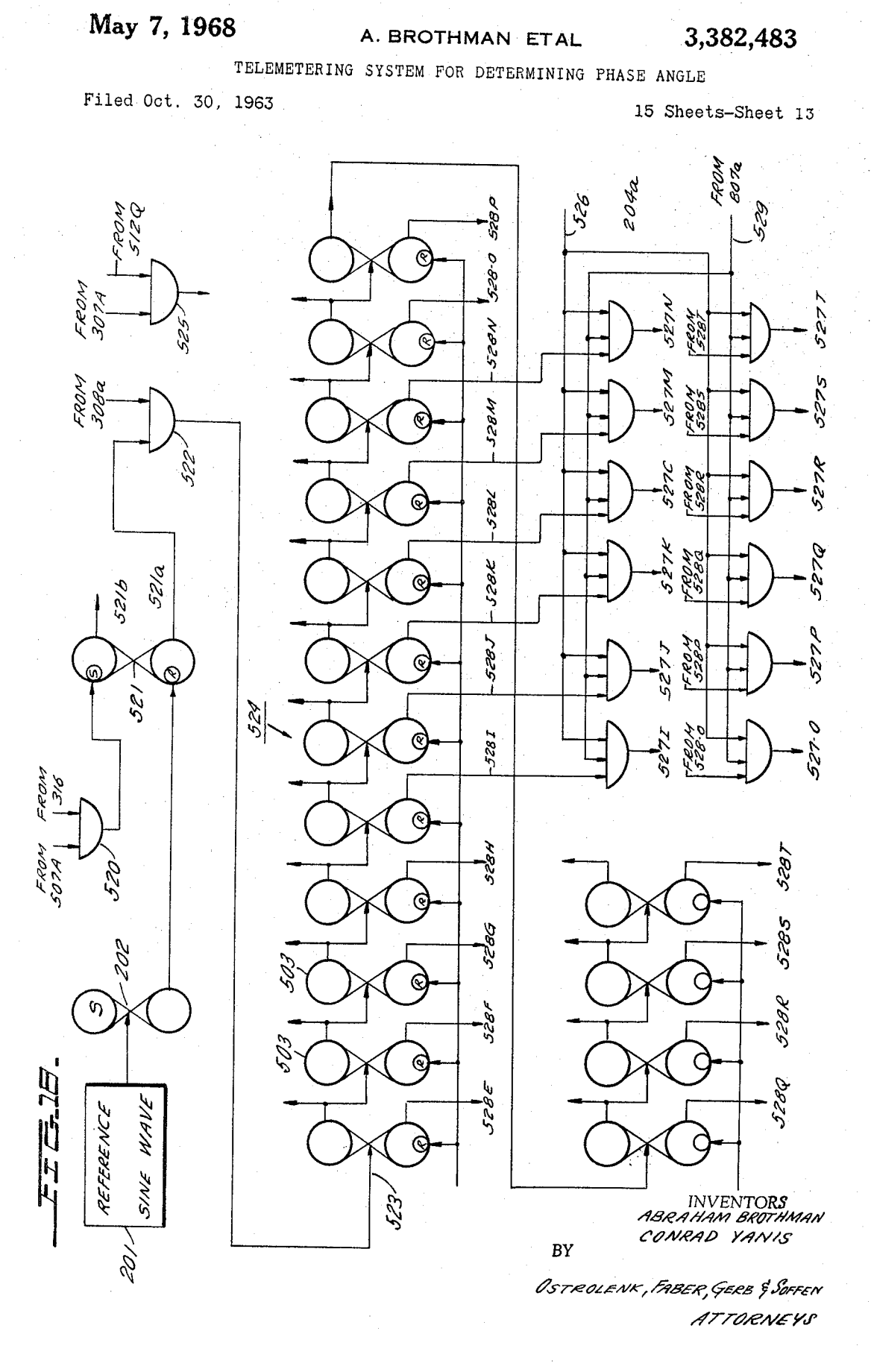

At the completion of the $t_2$ measurement, with the closing of AND gate 522, shown in FIGURE 18, due to the output terminal 521a of flip-flop 521 going to binary zero, simultaneously therewith, its output terminal 521b goes to binary one, which binary one condition is impressed upon the AND gate 505 of FIGURE 13. The other input terminal of AND gate 505 is connected to the zero count AND gate 507a of FIGURE 15. This causes AND gate 505 to open and this open condition is passed by OR gate 506 to the input terminal 502a of the count-of-16 counter 502. This steps counter 502 to contain a count-of-one. This count-of-one is recognized by the AND gate 512a of FIGURE 16 whose input terminals are connected to selected output terminals of counter 502 so as to open AND gate 510b at the count-of-one. This identifies the fact that the first $t_2$ count has been completed.

The counter 500 remains at the zero count at this time, keeping the zero count AND gate 507a in the open state so as to maintain the AND gate 520 of FIGURE 18 in the enabled state. Upon receipt of the next positive going portion of the 60 cycle clock pulse, this, again, sets flip-flop 521 to enable AND gate 522 for the second $t_2$ count. The second $t_2$ count is accumulated, together with the first $t_2$ count in the counter 524 of FIGURE 18, and the second $t_2$ count is terminated upon receipt of the next positive going portion of the squared reference sine wave which disables AND gate 522. Together with the disablement of AND gate 522, output terminal 521b of flip-flop 521 again goes to the binary one state to step the counter 502 of FIGURE 13 so as to contain the count-of-two. This operation continues in this manner for 16 counts until counter 502 contains a count-of-16, at which time its AND gate 512q of FIGURE 16 is opened to indicate the count-of-16. The output of AND gate 512q is impressed upon the AND gate 525, shown in FIGURE 18, the output of which is injected into the common bus 526 of FIGURE 18. The common bus 526 is connected to one input terminal of the AND gates 527i–527t, shown in FIGURE 18, to enable these AND gates. The second input terminals of each of the AND gates 527 are connected to the outputs 528i–528t of the $t_2$ counter 524, shown in FIGURE 18. It should be noted that the first four outputs 528e–528h are not impressed upon inputs of any AND gates so that by ignoring these four least significant digit positions the output of the $t_2$ counter 524 becomes the average of the 16 $t_2$ counts accumulated therein. The third input terminal of each of the AND gates 527 are connected to a common bus 529, the input of which is connected to the output of the near zero tag circuit 800, shown in FIGURE 19. The near zero tag circuit 800 is substantially identical to the near zero tag circuit 400, shown in FIGURE 11 of the drawings, located at each remote point. It should be understood that the common bus 529 will be in the binary one state when the $t_2$ reading is not a near zero reading. This enables the AND gates 527 to pass the averaged $t_2$ count to the data word transfer logic 205, shown in FIGURE 20, which is comprised of a plurality of OR gates 530a–530m, one input terminal of each being connected to an associated output terminal of the AND gates 527i–527t. The output terminals of the OR gates 530a–530m, shown in FIGURE 20, are connected to the computer input for storage thereof into memory. This data word is tagged by means of the output of AND gate 525, shown in FIGURE 18, which is connected to the computer patchboard 600, to indicate to the computer memory the fact that the word being transferred in the memory is to be tagged as the $t_2$ word and will thereby be stored in the appropriate location in memory. The patchboards 600–606 are shown in FIGURES 21 and 22 and may be wired between the computer memory and the outputs of the address logics circuits 211 of FIGURE 6, so that all data words transferred into memory will be tagged appropriately and hence will be addressed to the proper location in memory. It should be understood that while a patchboard arrangement, as shown herein, any other suitable means may be employed for the purpose of transferring the $t_2$ word as well as all other data words into the computer memory.

The output of AND gate 525, as shown in FIGURE 18, which enables the transfer of the averaged $t_2$ measurement to be shifted into memory, also enables the OR gate 531 of FIGURE 14 to pass this open condition to simultaneously reset the flip-flop 532 of FIGURE 14, which functions in a manner to be more fully described, as well as resetting counter 501, shown in FIGURE 13, by means of impressing the open condition upon the rest bus 533 of counter 501. This causes counter 501 to be reset so as to contain a count of zero at this time. It is recognized by the AND gate 510a, shown in FIGURE 16, which goes to the open condition. The AND gate 510a, being in the open condition, is indicative of the fact that the central dispatch office is now ready to receive from the first remote location in order to generate $t_5$ measurements from that location. The output of AND gate 510a is impressed upon the input of AND gate 601a, shown in block 601 of FIGURE 21. The second and third inputs of AND gate 601 are derived from the blocks 600 and 604 of FIGURES 21 and 22, respectively. Block 600 represents the output plugs of the computer patchboard for the 16 different $t_5$ measurements which will be taken. Block 604 are the output plugs representing the 25 different remote points in the network. Each of these are wired in combination to an AND gate of the type shown as 601a in FIGURE 21. While applying 16 to 25, it can be seen that there are 400 such AND gates of the type 601a. The output of AND gate 510a, shown in FIGURE 16, is employed to enable all of the 400 AND gates, only one of which will be completely opened upon the occurrence of a binary one condition from the blocks 600 and 604. For example, let us assume that the first remote location is now being called. The first step which this remote location will take is that of transmitting 16 clock pulses from its clock. These 16 clock pulses will be utilized to generate 16 $t_5$ measurements. At the first measurement thereof, one of the AND gates 601a of FIGURE 21, will receive a binary one from the AND gate 510a of FIGURE 16; will receive a binary one from the first remote station; and will receive a binary one from the block 600, to indicate that it is the first such $t_5$ measurement being taken. As the second $t_5$ measurement is taken, the second AND gate of the type shown as 601a, will be opened. This continues until 16 of the 400 AND gates of the type 601a are opened, each of these 16 AND gates being employed for the purpose of addressing the computer to store these $t_5$ measurements in the appropriate memory locations.

Returning now to FIGURE 13, in addition to counter 501 having been reset to contain a count-of-zero, the counter 500 receives at its input terminal 534 the output of OR gate 531, shown in FIGURE 14, so as to step the count of counter 500 to contain the count-of-one. This causes the AND gate 507b of FIGURE 15, to open, as well as causing the OR gate 507b' to open. The opening of AND gate 507b of FIGURE 15, energizes the station one patchboard position of block 604, shown in FIGURE 22, which, in turn, enables one of the 400 AND gates of the type 601a, shown in FIGURE 21.

The opening of OR gate 507b', shown in FIGURE 15, conditions the AND gate 535, shown in FIGURE 14, in readiness for an operation to be more fully described, at the completion of all of the $t_5$ counts.

The setting of the counter 500, shown in FIGURE 13, to contain a count-of-one, is impressed upon the block 700 of FIGURE 22 so as to establish a combination of tones to be transmitted through the central dispatch office transmitter means 213, shown in FIGURE 6. The tone combination generated is that tone combination which identifies the first remote location to be called. This remote location is the only one which responds to that call and does so by first transmitting 16 of the 60 cycle clock pulses from its local clock. These clock pulses are impressed upon one input of OR gate 518, shown in FIGURE 19, as well as the set input terminal of a flip-flop 540, shown in FIGURE 17. This first clock pulse impressed upon OR gate 518 of FIGURE 13, causes the counter 502 to reset to zero. The clock pulse impressed upon the flip-flop 540, shown in FIGURE 17, sets its output terminal 540a to binary one, to enable the AND gate 541. Flip-flop 540 and AND gate 541 form part of the $t_5$ counter means 204, shown in FIGURE 17. The $t_5$ counter is further comprised of a suitable counting means 542 having a plurality of flip-flop stages 503 connected in the manner shown and having its input terminal 543 connected to the output of AND gate 541. The other input of AND gate 541 is connected to the 240 kilocycle clock output to impress the 240 kc. pulses upon the counter 542. As each are being generated in this manner the counter 542 increases its count by one upon the receipt of each 240 kc. pulse until the occurence of the next 60 cycle clock pulse on the central dispatch office clock. This is impressed upon the reset input terminal of flip-flop 540, shown in FIGURE 17, so as to disable AND gate 541 and further to cause the output terminal 540b to go to binary one. This condition is impressed upon the AND gate 504, shown in FIGURE 13, which further receives a binary one indication from the output 532b of flip-flop 532 shown in FIGURE 14. This flip-flop 532 has its output terminal 532b set to binary one after the $t_1$ word had been written in to memory. This operation thus opens gate 504 of FIGURE 13, which opened condition is passed by the OR gate 506 to step the counter 502 to a count-of-two. This enables the AND gate 512b of FIGURE 16 to be opened, which is connected to the patchboard 600 of FIGURE 21, to provide an indication to the computer memory that the second $t_5$ count is about to be generated. Immediately prior thereto, the output 540b from flip-flop 540, shown in FIGURE 17, is also impressed upon the common bus 544, shown in FIGURE 17, which is connected to one input of the AND gates 545a–545l. The other inputs of AND gates 545 are connected to the output terminals 546a–546l of $t_5$ counter 542, causing the first $t_5$ measurement to be passed through gates 545 to associated input terminals of the OR gates 530a–530m, shown in FIGURE 20, which then transfer the first $t_5$ measurement into memory, together with the tagged signal, to indicate that it is the first $t_5$ measurement from the first remote station.

The next pulse from the remote station 60 cycle clock is then impressed upon the set input terminal of flip-flop 540, shown in FIGURE 17, which again enables AND gate 541 to pass 240 kc. pulses to counter 542, for generation of the next $t_5$ measurement count. The second $t_5$ measurement count is terminated upon receipt of the 60 cycle clock located at the central dispatch office, which triggers the reset input terminal of flip-flop 540, shown in FIGURE 17, to terminate the second $t_5$ count. This disables AND gate 541 and the output terminal 540b is again impressed upon one input of AND gate 504, shown in FIGURE 13, causing the counter 502 to step to the count of three. The remaining $t_5$ measurements from the third to the 16th, are generated in a like manner and appropriately tagged so as to be located in the proper address and memory by means of the AND gates 512a–512r of FIGURE 16. When the 16th $t_5$ measurement has been completed, the AND gate 512q of FIGURE 16, opens and impresses this open condition upon the second input terminal of AND gate 535, shown in FIGURE 14, causing this AND gate to set flip-flop 532 which causes the output terminal 532a to go to binary one and the output terminal 532b to go to binary zero. Output terminal 532a enables AND gate 536 of FIGURE 14, which receives a signal at its second input terminal from the central dispatch office receiver 218, shown in FIGURE 6, to indicate that the 16 clock pulses from the remote station being called have been successfully received. The output of AND gate 536 in FIGURE 14 is impressed upon OR gate 537, the output of which is impressed upon the input terminal 501a of counter 501, shown in FIGURE 13, for the purpose of advancing this counter to the count-of-one. This count-of-one opens the count-of-one AND gate 510b, shown in FIGURE 16. The output of this AND gate is then impressed upon the patchboard 602, shown in FIGURE 21 and is employed at this point as a tag signal to indicate that the central dispatch office is about to receive the $t_1$ reading from the remote station being called. The $t_1$ plug from patchboard 602 is connected to an AND gate 603a in block 603, shown in FIGURE 21, there being 100 such AND gates. The second input of the AND gate 603 is connected to one of the plugs from the block 604, shown in FIGURE 22. There are 25 plugs shown in block 604 to represent each of the 25 remote locations. Since there are four types of information, namely, the $t_1$ measurement, the $t_4$ measurement, the wattmeter measurement and the varmeter measurement, 25 x 4 yields 100 AND gates of the type 603a, which AND gates are employed for the purpose of addressing each such reading to the appropriate position in memory.

Assuming that the 16 clock pulses from the remote point have been received successfully so that no repeat transmission request is required of the central dispatch office, this causes the remote point being called to then transmit its $t_1$ measurement to the central dispatch office. The binary bits of the $t_1$ measurement are impressed upon one input terminal of the OR gates 530a–530m, shown in 20, which ultimately impress the $t_1$ word into the computer memory. The $t_1$ word is tagged with the signal generated by the count-of-one AND gate 510b of FIGURE 16, so that the $t_1$ word will be addressed in the appropriate position in memory. A further tag constitutes identification of the remote point from which the $t_1$ word is being received, which is provided for by the first remote point AND gate 507b of FIGURE 15. These tagged bits serve to open the appropriate one of the 100 AND gates of the type 603a, shown in FIGURE 21.

When the $t_1$ measurement has been successfully received from the remote point the central dispatch office receiver imposes a successful reception of word signal upon the input of AND gate 536, shown in FIGURE 14. This passes through OR gate 537 and ultimately to the input terminal 501a of counter 501 shown in FIGURE 13. This advances the counter by one additional count, causing the AND gate 510c of FIGURE 16, to open, so as to serve as an indication that the next word to be received will be the $t_4$ measurement. This indication is impressed upon the patchboard block 602 of FIGURE 21, which in turn, triggers one of the 100 AND gates of the type 603a of FIGURE 21, so as to tag the received $t_4$ measurement word with the correct address. Successful receipt of the $t_4$ word again causes the AND gate 536 of FIGURE 14 to be opened so as to ultimately advance the count by one of the counter 501 of FIGURE 13. This continues until all four of the data words, from the remote point have been successfully received, namely, the $t_1$, $t_4$, wattmeter and varmeter data words.

When the fourth data word has been received, the count-of-four in counter 501 of FIGURE 13, causes the AND gate 510e of FIGURE 16 to be open-circuited, which condition is impressed upon the AND gate 514 of FIGURE 14. This, coupled with the binary one state of output terminal 532a of flip-flop 532, shown in FIGURE 14, causes AND gate 514 to open, which first serves to reset flip-flop 532 through OR gate 531 and is also applied to one input of AND gate 513, shown in FIGURE 14. The output of OR gate 531 of FIGURE 14 is also impressed upon the input terminal 534 of counter 500, shown in FIGURE 13, to advance the count of counter 500 by one. This causes the next remote point to be called by means of the selected outputs of counter 500 being connected to the tone transmitters through block 700, shown in FIGURE 22. The entire cycle is repeated for the second remote point and this continues in this manner until the 25th remote point transmits all of its information. At this time the output of AND gate 514, shown in FIGURE 14, is connected to one input of AND gate 513, the other input of which is connected to the AND gate 507a' shown in FIGURE 15, which indicates that the 25th remote point has been called. When the 25th remote point has been called and when the last, or varmeter reading has been successfully received, AND gate 513 opens to reset flip-flop 515 of FIGURE 14, to enable AND gate 516, in order to initiate a new measurement command to begin a completely new sweep. The measurement command is erased after a predetermined time period by means of connecting the output of AND gate 516 to the trigger input of a one-shot multivibrator 538. The output 538a of multivibrator 538 is connected to the reset input terminal of flip-flop 515 for the purpose of disabling AND gate 516 after a predetermined delay.

Thus it can be seen that the central dispatch office is provided with suitable circuitry for the purpose of taking 16 clock pulses, a $t_1$, $t_4$, wattmeter and varmeter reading from each remote location, sweeping each such remote location in sequence and upon completion of the entire sweep, re-initiating the measurement command operation.

As previously mentioned, the central dispatch office is provided with a near zero tag circuit 800, which is shown in FIGURE 19, which operates in a manner substantially identical to the near zero tag circuit 400, shown in FIGURE 11 of the drawings. The purpose of the near zero tag circuit, to review briefly, is that of indicating the fact that the 60 cycle clock and the reference sine wave at the central dispatch office are so close to being in synchronism as to safely be identified as having a zero phase angle therebetween. A second and very important function of the near zero tag circuit is to block the averaging operation when there exists the danger that the arithmetic average will not give a proper indication of the phase angle. This can occur in the following manner. If a first phase angle measurement is 359.5° and the second phase angle measurement is 0.4°, in both cases the phase angle is within ½° of a 0° or phase synchronized condition and it should be properly designated as a 0° phase angle. However, the average of a 359.5° and 0.5° measurement is 180°, which is definitely an improper indication of the phase angle measurement. The near zero tag circuit prevents such a false average from being generated in the manner described below. The circuit 800 of FIGURE 19 is provided with an AND gate 801 which is connected to selected output terminals of the counter 524, shown in FIGURE 18. When the $t_2$ count is being generated, if the count reaches or achieves a count-of-13, or greater, AND gate 801 opens to set the flip-flop 802 (which has been reset immediately prior thereto by the measurement command pulse) to cause its output terminal 802a to go to binary zero. This disables AND gate 803, thus preventing the output terminal 804a of flip-flop 804 going to binary one. If, however, the count-of-13 is not reached, AND gate 801 will not open, causing terminal 802a of flip-flop 802 to be in the binary one state to enable flip-flop 803.

As soon as the $t_2$ count is completed, output terminal 521b of flip-flop 521, shown in FIGURE 18, goes to the binary one state, causing AND gate 803 to open to set flip-flop 804 with its output terminal 804a in the binary one state. This is impressed upon OR gate 806 and is inverted by the inverter means 807 to provide a binary zero voltage level. This binary zero voltage level at output 807a is impressed upon the bus 529, shown in FIGURE 18, thus disabling the AND gates 527i–527t from passing any $t_2$ measurement, or in other words, causes a $t_2$ measurement of zero to be read into the computer.

In the second instance, if a count of 3987, or greater, is generated in the $t_2$ counter, this should also indicate a near zero tag signal. This is provided for by the AND gates 808–810 of FIGURE 19, which are connected to appropriate terminals of the counter 524, shown in FIGURE 18, so as to open all three gates 808–810 as soon as of count of 3987 is achieved. When this occurs, this causes AND gate 811 to open, thus enabling AND gate 812. Flip-flop 813, having been set by a measurement command at its set input terminal, causes gate 812 to open, impressing this condition upon the set input terminal of flip-flop 805. This causes its output terminal 805a to go to binary one, which state is passed through OR gate 806 and inverted to a binary zero state by inverter 807, which again disables the AND gates 527 of FIGURE 18 to cause a zero $t_2$ measurement to be fed into memory.

*The size of the $t_2$-AND $t_4$-measurement sets*

The function of iterated measurements of $t_2$ and $t_4$ is to minimize the error in such determinations by averaging. The size of a measurement-set is thus a matter of: (1) reducing the error in the mean to a specified fraction of the RMS measurement error; and/or, (2) holding the probability of a specified "discrepancy" in the balance of plus and minus deviations to less than a preset limit.

Relative to the reduction of the error in the mean to a specified fraction of the RMS measurement error, let $P^1 =$ the RMS dynamic error in $t_4$-measurements, and it will then follow that the "average error" in a $t_4$-measurement will be:

$$\frac{R}{\sqrt{\pi}}\int_0^\infty \epsilon e^{-R^2\epsilon^2} d\epsilon = \text{average error} = E_{AK} = \frac{\sqrt{2P'}}{\sqrt{\pi}}$$

$$k = \frac{1}{\sqrt{2P'}}$$

Under Gaussian error conditions, plus and minus errors in individual $t_2$ and $t_4$ measurements are equally likely. The imbalance between plus and minus errors in a "restricted" measurement set is therefore correctly represented by:

$$d = |r - R|$$

where: $d$=the discrepancy; $r$=the number of positive-residual determinations; and $R$=the number of determinations which are characterized by negative residuals. Here, it would be understood that both positive and negative residuals are taken with respect to the "best value" (average value) of the measurement.

If all of the discrepant measurement were to exhibit the "average error," the error in the mean ($E_o$) would then be:

$$\frac{\sqrt{2dP'}}{\sqrt{\pi m}} = E_o \qquad (20)$$

If $E_o$ is then specified, it follows that the upper bound for the ratio $d/m$ will be set by:

$$\frac{d}{m} = \frac{\sqrt{\pi}}{\sqrt{2}} \frac{E_o}{P'} \qquad (21)$$

Given $$m = m_o$$

and therefore that $$d_o = \frac{\sqrt{\pi}}{\sqrt{2}} \frac{E_o}{P'} m_o \qquad (22)$$

the probability that a $d_0$-discrepancy would be reached or exceeded is then given by:

$$1 - \frac{1}{\sqrt{\pi}}\int_0^{\frac{\sqrt{\pi}E_0 M_0^{1/2}}{\sqrt{2}\sqrt{0.5P'}}} e^{-x^2}dx \qquad (23)$$

*Correcting $t_4$ and $t_2$ measurement sets for the effects of system frequencies other than 60-cycle*

Normally, the need to correct $t_2$ and $t_4$ measurement sets for the effects of system frequencies other than 60 cycles does not exist for the reason that Equation 3 obviates this requirement. In instances where $t_4$-values and $t_2$-values may be used for the purpose of monitoring local phase shifts, the correction is easily made.

The effect of comparing a non 60-cycle sine wave to the local 60-cycle "clock" output is to introduce an offset factor $$\left[\frac{1}{f_s} - \frac{1}{60}\right] = t_e \qquad (24)$$

into each $t_4$ or $t_2$ measurement in a cumulative fashion so that the summed value of ($m$) consecutive observations is given by:

$$T_m = (t_m + t_e) + (t_m + 2t_e) + (t_m + 3t_e) + \ldots + (t_m + mt_e)$$

$$= mt_m + t_e \sum_{i=2}^{m+1} m_i$$

$$= mt_m + \frac{(m+1)^2 - (m+1)}{2} t_e$$

$$= mt_m + \frac{(m+1)^2 mt_e}{2} \qquad (25)$$

In Equation 25:

$T_m$=the summed result of $m$ observations of $t_2$ or $t_4$
$t_m$=any one value of $t_2$ or $t_4$ corrected to the 60 cycle "standard" reference condition
$t_e$=offset factor as per Equation 24

*Limiting the effect of link-caused error on $t_1$ and $t_5$ measurements*

In contrast to $t_2$ and $t_4$ measurements which are made under more or less ideal circumstances, $t_1$ and $t_5$ measurements are highly subject to link noise conditions. Since $t_1$ and $t_5$ are also subject to alteration due to inter-"clock" drift, and because the inter-"clock" "runout"-cycle restricts the number of measurements in a set, it is important to be able to legitimately cast out individual measurements which are "obviously improper" or "out-of-bounds."

Exactly because Gaussian error recognizes that large errors may occur in individual measurements, it is frequently difficult to exclude such results from a "best value" determination on any grounds other than arbitrary ones. To develop rigorous reasons for such exclusions, it is necessary that there be a high probability of an "abnormal erroring cause" under extraordinary circumstances which would of themselves have altered the precision of any one measurement. The cause for all errors in $t_1$ and $t_5$ measurements, except those due to the coincidence of the front and back porches of gating actions with 240 kc. pulses or those due to "clock"-drift, is a noise-induced binary inversion of the information carriers. The probability of ($P_N$) of such error is stated by:

$$P_N = A_e^{-b(S/N)2} \qquad (26)$$

where: ($b$) is a constant which is typical of the carrier equipment modulation mode: ($A$) is also a function of the equipment modulation mode, and is either a constant or a constant multiplying the noise-to-signal conditions; and $S/N$ is the signal-to-noise conditions of the link. Since the smallest unit of information carrier which can convey information is a half-cycle of the carrier, $P_N$ is indeed the probability of an errored half-cycle. A deviation of $\Delta t_M$ in a $t_1$ or $t_5$ measurement is thus reducible to $$\frac{\Delta t_M}{\frac{1}{2fc}} = 2fc\Delta t_M = B \text{ (half-cycles)} \qquad (27)$$

of successively errored half-cycles where $1/2f_c$ is the half-period of the carrier frequency; and, an error of $\Delta t_M$ is an error with a probability of:

$$P_N{}^\beta = P\Delta t_M \qquad (28)$$

where $Pt_M$ is the probability of a $\Delta t_M$ deviation.

If an "abnormal erroring cause" is the binary conversion of $$\beta \gg s$$

successive half-cycles of carrier, the "extraordinary circumstances" for such an error is a significant shift in the S/N conditions of the link, regardless of how temporary such a shift might be. In this connection, let there be two significantly different S/N conditions $r_1$ and $r_2$ such that $$r_1 > r_2$$

further, let it be true that the $r_2$ S/N condition is true of the line a proportion of time $\alpha$. Applying Bayes criterion to the conjunctive probability of an "abnormal erroring condition" and "extraordinary circumstances" and if $P_c=$ the probability of the conjunctive situations, then:

$$P_c = \frac{\alpha[e^{-br_2^2}]^\delta}{\alpha[e^{-br_2^2}]^\delta + (1-\alpha)[e^{-br_1^2}]^\delta}$$

$$= \frac{1}{1+\left(\frac{1-\alpha}{\alpha}\right)[e^{-b(r_1^2-r_2^2)}]^\delta} \quad (29)$$

Setting a threshold value on $P_c$ at which a casting-out of a $t_1$ or $t_5$ measurement is justified, it will be seen for any value of $r_1$, representing normal link conditions, there will exist, at specified values of $\sigma$, corresponding values of $\alpha$ and $r_2$.

Considering:

(a) the normal time variance of S/N-conditions and the usual magnitudes of such shifts
(b) the usual magnitude of the quantity (b) in Equation 29, it will be found that for $\sigma=3$, values of $\alpha$ corresponding to at least the normal incidence and duration of "burst noise" would be sufficient to establish values of $P_c$ equal to 0.5. Certainly, with measurements made to establish the excursions in S/N ratio from normal steady-state values and the usual duration of such excursions, there will exist values of deviations in $t_1$ and $t_5$ measurements which may be cast out with due attention to statistical rigor.

*Adjusting the mean $t_1$ and $t_5$ values for inter-clock drift*

Given values of $\bar{t}_1$ or $\bar{t}_5$ for the period of the most recent operation, as well as the long record $Pt_1$ and $Pt_5$ values, it is possible to provide for the continuous updating of the $\bar{t}_1$ and $\bar{t}_5$ values even in the face of restricted measurement sets.

Given the circumstances in which residuals in any value of $t_5$ greater than $\sigma/2fc$ are cast out, the average error should be:

$$\frac{2k}{\sqrt{\pi}} \int_0^{\frac{\delta}{2fc}} \epsilon e^{-k^2\epsilon^2} d\epsilon = \left[1 - e^{-\frac{\delta^2}{8Pt_5^2 fc^2}}\right]\frac{\sqrt{2Pt_5}}{\sqrt{\pi}} = E_{AV}. \quad (30)$$

Representing the imbalance between positive and negative residuals in any $t_5$ measurement set by $d_5$, it follows that if the discrepant measurements were to exhibit the average error, then $$E_5 = \frac{d_5}{n}\left[re - \frac{\delta^2}{\delta Pt_5^2 fc^2}\right]\frac{\sqrt{2Pt_5}}{\sqrt{\pi}} \quad (31)$$

would be the expected offset in the average of (n) measurements of $t_5$ from the record value of $\bar{t}_5$, where:

$n=$ the number of measurements made of $t_5$ in any one selective telemeter cycle.
$E_5=$ the absolute value of the difference between the average of the (n) measurements of $t_5$ and the record-value of $\bar{t}_5$
$Pt_5=$ the record-long term value of the RMS error in $t_5$-measurements For convenience's sake if we set $$\left[1 - e^{-\frac{\delta^2}{\delta Pt_5^2 fc^2}}\right] = K \quad (32)$$

and if the value for $d5/n$ calculated from $$\frac{d_5}{n} = \frac{\sqrt{\pi}E_5}{K\sqrt{2Pt_5}} \quad (33)$$

is one for which the probability by $$1 - \int_0^{\frac{d_5}{\sqrt{0.5n}}} e^{-x^2}dx = Pd_5 \quad (34)$$

is less than 0.5, then:

(i) If $\bar{t}_5{}'$ is the mean of the $n$ measurements of $t_5$ and $$\sum_{i=1}^{n} \frac{|t'_5 - t_5|_i^2}{n} \approx Pt_5^2 \quad (35)$$

where $|\bar{t}_5 - t_5|_i =$ the residual for any one measurement in the set of $n$ measurements and (ii) If a complementary trend is indicated in $t_1$ measurements, it follows that an inter-clock "clock"-drift has occurred. Since by Equation 2, on the assumption of a constancy of $\bar{t}_3{}'$, $$-\Delta t_1 = \Delta D$$

while by the equivalent assumption in Equation 2, $$\Delta t_5 = \Delta D$$

it may be said that both $\bar{t}_1$ and $\bar{t}_5$ may be updated by the amount of $E_5$.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. For use in a power distribution network, means for measuring the phase angle relationship of the voltages at remote points in the network, comprising first clock means at the first point; second clock means at the second point; first means for measuring a first phase angle between said first clock means and the voltage at said first point; second means for measuring a second phase angle between said second clock means and the voltage at said second point; third means at said first point for generating a command signal to control the clock means at said first and second points to generate said first and second phase angle measurements at a predetermined time; fourth means at said second point for generating a third phase angle measurement between the receipt of said command signal and the next clock pulse generated at said second point by said second clock means; fifth phase angle measuring means at said first point for generating a fourth phase angle measurement; sixth means at said second point for generating a second command signal to initiate said fifth means to measure the phase angle between receipt of said second command signal and the next clock pulse generated at said first point by said first clock means.

2. The system of claim 1 further comprising seventh means at said second point for transmitting said second and third phase angle measurements to said first point.

3. The system of claim 1 further comprising eighth means at said first point for processing said first, second, third and fourth phase angle measurements coupled to said eighth means to compute the phase angle relationship of the voltages at said first and second points in said network.

4. For use in measuring the phase angle relationship between voltages at first and second remote points in a power distribution network, means at one of the remote points comprising a clock source for generating a high frequency pulse train; second means controlled by said clock source for generating a low frequency pulse train; means at a first point for initiating a measurement command signal; third means at a second point responsive to said measurement command signal for generating a first phase angle measurement between said second means and said command signal; fourth means responsive to said measurement command signal at said second point to generate a second phase angle measurement between said associated second means and the voltage at said second point.

5. The system of claim 4 further comprising fifth means at said second point for transmitting said first and second phase angle measurements to said first remote point.

6. For use in a power distribution network, a telemetry system for determining the phase angle between voltages at two remote points in the network comprising first and second high frequency clock pulse sources at first and second remote points; third and fourth low frequency clock pulse sources at said first and second remote points; first means at said first remote point for transmitting a measurement command signal; second means at the second remote point for measuring a first phase angle between said measurement command signal and the next low frequency clock pulse generated at said second remote point by said fourth clock pulse source; third means at said second remote point for measuring a second phase angle between said low frequency clock pulse source and the network voltage at said second remote point; fourth means for transmitting said first and second phase angle measurements to said first remote point.

7. The system of claim 6 further comprising fifth means responsive to said measurement command signal for measuring a third phase angle between said measurement command signal and the next low frequency clock pulse generated at said first remote point by said third clock pulse source; sixth means for measuring a fourth phase angle between said third low frequency clock pulse source and the network voltage at said first remote point.

8. The system of claim 7 further comprising seventh means at said first remote point for receiving said first and second phase angle measurements.

9. The system of claim 6 wherein said second means is comprised of a first counter; first gate means for connecting said first high frequency clock pulse source to the input of said counter upon receipt of said measurement command signal and for disconnecting said counter from said first high frequency clock pulse source upon receipt of the first clock pulse generated by said third low frequency clock pulse source after said measurement command signal.

10. The system of claim 9 wherein said third means comprises a second counter; second gate means for connecting said second high frequency clock pulse source to the input of said second counter upon receipt of the positive going portion of the voltage at said second remote point and for disconnecting said second counter from said second high frequency clock pulse source upon receipt of the first clock pulse generated by the fourth low frequency clock pulse source after receiving the positive going portion of the voltage at said second remote point.

11. The system of claim 9 further comprising fifth means at second remote point for enabling said first gate means to operate a predetermined number of times in response to one command signal to accumulate a plurality of counts in said first counter.

12. The system of claim 11 further comprising sixth means for dividing the accumulated count in said first counter to obtain an average value for the counts accumulated in said first counter.

13. For use in a power distribution network, a telemetry system for determining the phase angle between voltages at two remote points in the network comprising first and second high frequency clock pulse sources at first and second remote points; third and fourth low frequency clock pulse sources at said first and second remote points; first means at said first remote point for transmitting a measurement command signal; second means at the second remote point for measuring a first phase angle between said measurement command signal and the next low frequency clock pulse generated at said second remote point; third means at said second remote point for measuring a second phase angle between said low frequency clock pulse source and the network voltage at said second remote point; fourth means for transmitting said first and second phase angle measurements to said first remote point; fifth means responsive to said measurement command signal for measuring a third phase angle between said measurement command signal and the next low frequency clock pulse generated at said first remote point; sixth means for measuring a fourth phase angle between said low frequency clock pulse source and the network voltage at said first remote point; said second means comprising a first counter; first gate means for connecting said high frequency clock to the input of said counter upon receipt of said measurement command signal and for disconnecting said counter from said high frequency clock upon receipt of the first clock pulse generated by said low frequency clock after said measurement command signal.

14. The system of claim 13 wherein said fifth means comprises a second counter; second gate means for connecting said high frequency clock to the input of said second counter upon receipt of the positive going portion of the voltage at said second remote point and for disconnecting said counter from said high frequency clock upon receipt of the first clock pulse generated by the low frequency clock after said position going portion of the voltage at said second remote point.

15. The system of claim 14 further comprising seventh means at said second remote point for enabling said first gate means to operate a predetermined number of times in response to one command signal to accumulate a plurality of counts in said first counter.

16. The system of claim 15 further comprising eighth means for dividing the accumulated count in said first counter to obtain an average value for the counts accumulated in said first counter.

17. For use in a power distribution network, a telemetry system for determining the phase angle relationship between the voltage at a central point and the voltages at a plurality of remote points in the network comprising first clock means at said central point; a second clock means at each of said remote points; first means at said central point for transmitting a measurement command signal to all of said remote points; second means at each of said remote points for measuring a first phase angle between said measurement command signal and the next occurring clock pulse from the second clock means at the associated remote point; third means at each remote point for measuring a second phase angle between the clock pulse of the associated second clock means and the network voltage at its associated remote point.

18. The system of claim 17 further comprising fourth means at said central point for measuring a third phase angle between the clock pulse of said first clock means and the network voltage at the central point.

19. The system of claim 18 further comprising fifth means at each remote point for transmitting a clock pulse signal from its associated second clock means to said central point; sixth means at said central point for measuring a fourth phase angle between each of said received clock pulses and the central point clock pulse from said first clock means.

20. Telemetry means for use in a power distribution network employed for measuring phase angles between voltages at a central point and a plurality of remote points in the distribution network comprising a central dispatch point having first means for generating a measurement command signal; a high frequency clock means; dividing means connected to the high frequency clock means for generating a low frequency signal; first counter means;

first gate means responsive to said command signal and the voltage at said central point for connecting said high frequency clock means to said first counter means; said first gate means including means for disconnecting said high frequency clock means on the occurrence of the next signal generated by said dividing means; said system further comprising a high frequency clock at each remote point; dividing means at each remote point connected to the high frequency clock thereat for generating a low frequency signal; counter means at each remote point, gate means at each remote point responsive to a command signal for connecting the associated high frequency clock at the remote point to the counter means thereat, said gate means at each remote point including means responsive to the next pulse generated by the associated dividing means at its point to disconnect the associated high frequency clock from the counter means thereat; and transmitter means at each remote point for transmitting the count developed in the counter means thereat to a second remote point in said system.

21. The system of claim 20 further comprising means at said central dispatch point for transmitting said command signal to a plurality of remote points in simultaneous fashion; said transmitting means including means for transmitting data request signals to said remote stations in sequential fashion; means at said remote points for transmitting the counts accumulated in the counter means at said remote points to said central dispatch point.

References Cited
UNITED STATES PATENTS

| | | | |
|---|---|---|---|
| 2,564,439 | 8/1951 | Marrison | 307—87 |
| 2,877,416 | 3/1959 | Grisdale | 324—68 |
| 2,977,538 | 3/1961 | Secretan | 324—83 |
| 3,098,215 | 7/1963 | Waite | 340—151 |
| 3,209,254 | 9/1965 | Hossmann | 324—68 |
| 3,229,203 | 1/1966 | Minohara | 324—83 |

JOHN W. CALDWELL, *Primary Examiner.*

NEIL C. READ, THOMAS B. HABECKER, *Examiners.*

H. PITTS, *Assistant Examiner.*